(12) United States Patent
Berelejis et al.

(10) Patent No.: US 9,741,244 B2
(45) Date of Patent: Aug. 22, 2017

(54) METHODS, SMART OBJECTS, AND SYSTEMS FOR NAMING AND INTERACTING WITH SMART OBJECTS

(71) Applicant: QUALCOMM Incorporated, San Diego, CA (US)

(72) Inventors: Gabriel Berelejis, Mevaseret Zion (IL); Nathan Altman, San Diego, CA (US); Gilad Bornstein, Hod HaSharon (IL); Joshua Hershberg, Beit Shermesh (IL); Wayne Fenton, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 14/709,082

(22) Filed: May 11, 2015

(65) Prior Publication Data

US 2015/0348403 A1 Dec. 3, 2015

Related U.S. Application Data

(60) Provisional application No. 62/005,041, filed on May 30, 2014.

(51) Int. Cl.
*G08C 23/02* (2006.01)
*H04L 12/28* (2006.01)

(52) U.S. Cl.
CPC .......... *G08C 23/02* (2013.01); *H04L 12/2809* (2013.01); *H04L 2012/2841* (2013.01)

(58) Field of Classification Search
CPC ................. G08C 23/02; H04L 12/809; H04L 2012/2841
(Continued)

(56) References Cited

U.S. PATENT DOCUMENTS 8,392,947 B2 3/2013 Grannan et al.
2006/0250980 A1* 11/2006 Pereira ................ H04L 12/2803
370/254
(Continued)

FOREIGN PATENT DOCUMENTS

WO 2006135758 A1 12/2006
WO 2009153708 A1 12/2009
WO 2011045719 A1 4/2011

OTHER PUBLICATIONS

Dautriche R., et al., "End-User-Development for Smart Homes: Relevance and Challenges," In Proceedings of the Workshop "EUD for Supporting Sustainability in Maker Communities", 4th International Symposium on End-user Development (IS-EUD), 2013, 6 pages.
(Continued)

*Primary Examiner* — George Bugg
*Assistant Examiner* — Thang Tran
(74) *Attorney, Agent, or Firm* — The Marbury Law Group

(57) ABSTRACT

A control device executing a networking framework for controlling a network of smart objects registered with a framework may interact with only those smart objects in a room. A radio frequency signal broadcast on the networking framework for reception by smart objects registered with the networking framework may cause each of the plurality of smart objects to transmit an ultrasound signal that may include an identifier, such as a generic identifier of the smart object that was assigned during registration with the network framework. The control device may receive the ultrasound signals only from the smart objects in the room. The control device may rename each smart object from which ultrasound signals were received with new identifying information that may include a reference to the room. The device may then
(Continued)

communicate with the smart objects via the networking framework using the new identifying information.

30 Claims, 12 Drawing Sheets

(58) Field of Classification Search
USPC .......................................................... 367/197
See application file for complete search history.

(56) References Cited

U.S. PATENT DOCUMENTS

| | | | | |
|---|---|---|---|---|
| 2008/0218334 | A1* | 9/2008 | Pitchers | H04L 41/0893 340/539.1 |
| 2008/0224026 | A1* | 9/2008 | Pasternak | G01J 5/0022 250/206 |
| 2011/0234366 | A1* | 9/2011 | Feng | G08C 17/02 340/3.1 |
| 2011/0235466 | A1* | 9/2011 | Booij | H04B 11/00 367/135 |
| 2012/0268286 | A1 | 10/2012 | Jin et al. | |
| 2012/0274234 | A1* | 11/2012 | Campbell | H05B 37/0245 315/294 |
| 2012/0312874 | A1* | 12/2012 | Jonsson | G06Q 10/087 235/385 |
| 2013/0026940 | A1 | 1/2013 | Ganick et al. | |
| 2013/0223279 | A1* | 8/2013 | Tinnakornsrisuphap | H04L 41/0809 370/254 |
| 2013/0346559 | A1 | 12/2013 | Van Erven et al. | |
| 2014/0015415 | A1* | 1/2014 | Lim | H05B 37/02 315/131 |
| 2014/0269212 | A1* | 9/2014 | Xiang | G08C 23/02 367/197 |
| 2014/0347173 | A1* | 11/2014 | Yamaguchi | G06F 21/12 340/12.28 |
| 2015/0120000 | A1* | 4/2015 | Coffey | H04L 12/2803 700/13 |
| 2015/0195891 | A1* | 7/2015 | Ku | H05B 37/02 315/131 |
| 2016/0044035 | A1* | 2/2016 | Huang | H04L 63/0272 726/4 |

OTHER PUBLICATIONS

International Search Report and Written Opinion—PCT/US2015/030377—ISA/EPO—dated Aug. 13, 2015.
Bahl P., et al., "RADAR: An In-Building RF-based User Location and Tracking System," Proceedings of Nineteenth Annual Joint Conference of the IEEE Computer and Communications Societies, IEEE INFOCOM 2000, Mar. 26-30, 2000, pp. 1-10.
Kindberg T., et al., "Validating and Securing Spontaneous Associations between Wireless Devices," Hewlett-Packard Company, Sep. 12, 2002, pp. 1-6.

* cited by examiner

METHODS, SMART OBJECTS, AND SYSTEMS FOR NAMING AND INTERACTING WITH SMART OBJECTS

CROSS-REFERENCE TO RELATED APPLICATIONS

The present application claims the benefit of priority to U.S. Provisional Patent Application No. 62/005,041, entitled "Methods, Smart Objects, and Systems for Naming and Interacting with Smart Objects," filed on May 30, 2014, the entire contents of which are incorporated herein by reference.

BACKGROUND

With the advent of the "Internet of Things," such as smart objects in the home, office, or facility, the need for simplified interactions with smart objects is rapidly increasing. To facilitate internetworked smart objects and control devices, various communication protocols have been developed. However, these communication protocols may not fully address challenges associated with interacting with smart objects.

In a conventional communication protocol for communicating and/or networking with smart objects, a user interacts with smart objects that are connected to a network by addressing the object according to a generic name that is assigned during a registration process. The smart objects then appear by name on an application display of the control device. When many controllable smart objects having a generic or default name are present in the network, a user-interface challenge arises as users may be frustrated by a long list of all the objects connected in the network. It becomes difficult for users (i.e., humans) to distinguish smart objects that may appear on a display or in a physical space for purposes of selecting individual smart objects for control. In other words, interactions with a device may be difficult because the association between the generic names and the actual objects in a space are not always easily known by the user based simply on seeing the generic name listing in a user interface. When large numbers of smart objects, particularly those of the same type, are present in the home or facility (e.g., in different rooms and levels), it becomes even more challenging for users to know the association between generic names and actual smart objects for the purpose of addressing specific smart objects targeted for interaction. In particular, because the generic name may not be sufficiently descriptive (e.g., SmartBulb1, Smartbulb2, . . . ) a user may have difficulty determining which object name to select for interactions with a particular object of interest.

Interaction and control of smart objects may be provided by radio-frequency (RF) networks (e.g., WiFi, Bluetooth, etc.) based on application interfaces to communication resources and object features provided by the communication protocol. Within such protocols, user interactions with smart objects rely on addressing the objects using RF communications. With the ability to individually address smart objects, users can control an object simply by selecting the smart object based on its name and then entering a command, such as pressing a virtual key on a smart phone to cause the smart object to take an action, change its state or status, report a condition, and so on, based on RF communications addressed to and received from the selected smart object. A user may thereby individually control/interact with any smart object in a network within range of the RF communications. In most cases, such RF communications penetrate walls and floors and provide access to all smart objects in RF communications range in the home or facility. However, this capability makes it difficult to distinguish objects within a single room for room-specific addressing and control.

As noted, when many objects have a generic or default name, it becomes difficult for a user to distinguish one or more smart objects that are within certain areas of interest (e.g., same room) for purposes of control. In some conventional communication/network protocols, object names may be changed using a configuration process. However, changing the object name must be conducted individually. Therefore, in situations in which many objects may be present within a home or facility, discriminating objects that are within a room from other objects within a home or facility may be difficult. Further when many objects, such as objects of the same type may be present within a room in a home or facility, individual renaming may be quite tedious.

SUMMARY

The various embodiments include methods and devices implementing the methods for interacting with smart objects in a defined area by a control device executing a networking framework, including interactions involving pointing based control of smart objects. An embodiment method may include operations performed by the control device. The operations may include broadcasting a signal on a first communication channel associated with the networking framework for reception by a plurality of the smart objects registered with the networking framework and configured to cause one or more of the plurality of the smart objects to transmit a response signal via a second communication channel associated with the networking framework, including a generic identifier of the one or more of the plurality of the smart objects that was assigned during registration with the networking framework. The operations may further include receiving by the control device the response signals transmitted by a subset of the plurality of the smart objects that are within the defined area, and renaming within the networking framework each smart object from which the response signals were received with new identifying information, such as one or more of a new name, a new tag, a new identifier, new metadata, etc., that includes a reference to the defined area in which the control device and the subset of the plurality of the smart objects are located. The operations may further include communicating with one or more of the renamed smart objects via the networking framework using the new identifying information including the reference to the defined area.

In some embodiments, the operations may further include assigning one or more of the renamed smart objects to a group, and the new identifying information may further include a reference to the assigned group. The operations may further include receiving from one or more of the renamed smart objects, ultrasound signals in two or more ultrasound receivers of the control device, and calculating a relative position of the one or more renamed smart objects based on the received ultrasound signals.

In some embodiments, the operations may further include transmitting from the control device to one or more of the renamed smart objects ultrasound signals configured to be received in two or more ultrasound receivers associated with each of the one or more of the renamed smart objects so as to enable each of the one or more of the renamed smart objects to calculate a relative position of the control device based on the received ultrasound signals. In such embodiments, the operations may further include receiving the calculated relative position transmitted from the one or more of the renamed smart objects to the control device on the first communication channel.

In various embodiments, the first communication channel of the networking framework may be a radio communication channel and the second communication channel of the networking framework may be an ultrasound communication channel.

In some embodiments, the operations may further include determining, in the control device, one or more of a presence of, a relative bearing to, and a position of each of the plurality of smart objects from which ultrasound signals were received. In such embodiments, renaming within the networking framework of each of the smart objects from which ultrasound signals were received may be based on the determined one or more of the presence, the relative bearing to, and the position of each of the plurality of smart objects from which ultrasound signals were received.

In some embodiments, the operations may further include determining a pointing direction of the control device, comparing the determined pointing direction with one of the determined relative bearing to or the position of each of the smart objects in the subset of the plurality of smart objects within the defined area, and providing an indication on a display of the control device of one of the plurality of smart objects having a relative bearing to or position that corresponds to the pointing direction of the control device based on comparing the determined pointing direction with the one of the determined relative bearing to or position of the one of the plurality of smart objects.

In some embodiments, the operations may further include registering each of the plurality of smart objects with the networking framework, including assigning a generic unique identifier to each of the plurality of smart objects for addressing communications to each of the plurality of smart objects via the networking framework, and registering the control device with the networking framework during which the control device receives a list of the plurality of smart objects including their assigned generic identifiers. In such embodiments, the secondary communication channel may be an audio communication channel having a frequency below 20 Khz.

Further embodiments include a control device having a transceiver and a processor configured with processor-executable instructions to perform operations of the embodiment methods described above. In some embodiments, a control device may execute a client for a networking framework and may include means for performing operations of the embodiment methods described above.

Further embodiments may include a non-transitory processor-readable storage medium on which are stored processor-executable instructions to perform operations of the embodiment methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
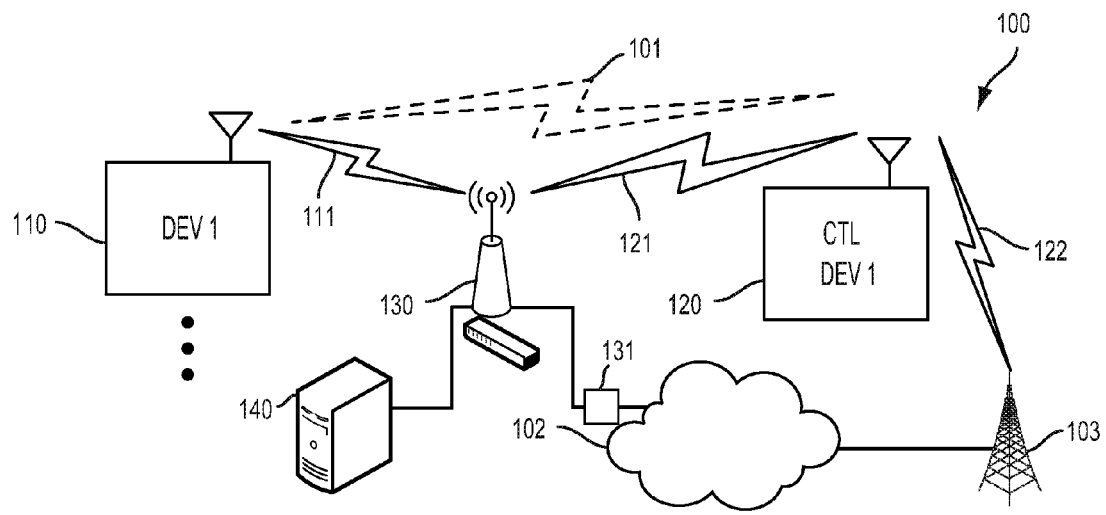
FIG. 1A is a communication system diagram illustrating components of a smart object network.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "control device" may refer to any one or all of personal or mobile computing smart objects, multi-media players, laptop computers, tablet computers, palm-top computers, personal computers, television set top boxes, integrated digital televisions, cable television receivers, and similar personal electronic smart objects which include a programmable processor and memory and circuitry for performing operations of the various embodiments.

As used herein, the terms "smart object," "smart device" or "device" may refer to any one or all of smart appliances (coffee makers, refrigerators, thermostats, blind controls, ovens, washers/dryers, etc.), smart light bulbs, smart speakers, smart personal or mobile computing smart objects, smart multi-media players, laptop computers, tablet computers, palm-top computers, personal computers, television set top boxes, integrated digital smart televisions, cable television receivers, and similar personal electronic smart objects which include a programmable processor and memory and circuitry for receiving and decoding content received from a digital video broadcast system or from a communication network (e.g., WiFi, Bluetooth (BT), BTLE, etc.). Reference to "smart" in connection with these smart objects may refer to the capability to communicate the device status and control and operate the device remotely through a communication network or networking framework.

The term "renaming" as used herein may refer to changing a generic identifier to include new identifying information associated with a smart object. Renaming may include, but is not limited to tagging, identifying, or otherwise adjusting a name, identifier, and/or metadata associated with a smart object. For example, the new identifying information may be a tag, a new name, a new identifier, new metadata, and so on. In some embodiments, a name, such as the generic name or identifier, associated with a smart object may be changed. In some embodiments, a tag may be added to information associated with a smart object. In other embodiments, the identifier may be changed. In still other embodiments, metadata may be changed or added to information associated with the smart object. Such embodiments may facilitate identification of the smart object. In such embodiments, a name of the smart object may remain unchanged or may be changed. Other combinations of renaming, tagging, identifying, etc. may be possible.

The term "networking framework" as used herein may refer interchangeably to a communications framework, an applications framework, and organized systems of communication and application-interaction protocols and commands for facilitating device-to-device (e.g., peer-to-peer or "P2P") and application-to-application communications and interactions. A networking framework may be implemented as a collection of Application Programming Interfaces (APIs), Software Development Kits (SDKs), and other application or system software that collectively provide standard mechanisms and interface definitions to enable interfacing between controlling and controlled smart objects coupled through a communication network that may be an ad hoc network. The various APIs and SDKs may provide high level access (e.g., from an application layer) to functions that would normally be accessed or controlled at a lower layer in a software architecture. Such functions may include, but are not limited to, ad hoc networking, security, pairing, device discovery, service discovery, platform transparency, radio access control, message formatting, message transmission, message reception and decoding, and so on. Some examples of organizations providing support for peer-to-peer interactivity include the Digital Living Network Alliance (DLNA®), Universal Plug and Play (UPnP) Alliance, and Bonjour. However, these technologies are generally device-centric and tend to operate at the lower layers within a software architecture (e.g., at the IP transport layer). An example of a comprehensive networking framework is the AllJoyn® Core Framework initially developed by Qualcomm Innovation Center and hosted by the Allseen Alliance.

The AllJoyn® Core Framework includes a set of service frameworks that are simple and enable users to interact with nearby object. An example of a set of service frameworks may include: Device Information & Configuration—the device broadcasts information such as device type, manufacturer and serial numbers; also allows the user to assign a name and password to the device; Onboarding—allows objects to be easily connected (e.g., via an intermediary such as an access point) to the user's network; Notifications—objects may broadcast and receive basic communications (e.g., text, image/video, audio, control, status); Control Panel—a control device such as a smartphone or tablet may control another object via a graphical interface (e.g., GUI or UI); Audio—audio source objects may stream to selected AllJoyn®—enabled speakers, audio receivers and other audio playback smart objects.

The various embodiments provide methods for facilitating the renaming (or tagging, identifying, etc.) of smart objects for network addressing, identification, communication and control. The various embodiments enable the discovery objects within a room and the renaming, tagging, identifying of networked smart objects with room-specific individual names and group names using a control device. A control device may be equipped with one or more microphones that may be configured to receive and process sound signals, which may be ultrasound signals. When equipped with one microphone, the control device may detect the presence of a smart object or smart objects by reception of the sound signals using the microphone. When equipped with one microphone, the control device may also be able to detect range or distance information. When equipped with at least two microphones, the control device may detect the presence and location or position information associated with the source of the sound signals. The smart objects may be configured to communicate via an RF network using a networking framework, such as an AllJoyn® framework. The smart objects may be equipped with a module that can at least broadcast audio or ultrasound signals that encode information (e.g., device ID, etc.).

In various embodiments, the control device may emit an RF signal via a networking framework to all smart objects within range of the signal to identify themselves via sound signals. The smart objects that receive this RF request signal may respond via sound signals, such as by emitting ultrasound signals that encode information associated with the object, such as a device ID, a default name, a current name, or other information.

The control device may receive the sound signals emitted by the smart objects and build or update a list/database of smart objects, which may include updating a user interface display of the smart objects currently available for interaction. The control device may execute automatic or user-prompted renaming, tagging, identifying, etc., via the networking framework processes. Because relatively high frequency sound, particularly ultrasound, does not readily pass through walls or floors, the ultrasound communications from smart objects in other rooms or floors may not be received by the control device. Thus, the use of sound signals in an out-of-band communication to respond to the control device facilitates the renaming process by limiting renaming to those smart objects in the same room as the control device. Further, the use of sound signals may allow a filtering of objects that are within a room from other objects within a home or facility. In addition, the filtering or renaming based on limiting communications to those devices in a rooms may facilitate other group related actions such as assigning permissions as a group or controlling as a group. Such limiting enables a simple naming convention in which the smart objects are identified by a room identifier prefix and simple suffix (e.g., Room1 smart object1, Room1 smart object 2, etc.).

The various embodiments encompass the use of an RF signal to trigger smart objects to identify themselves using sound signals on a secondary communication channel rather than responding by RF signal. The responding smart objects may transmit the self-identification signals, leveraging the fact that high frequency sound does not pass through walls, doors, floors or windows to thereby limit the number of smart objects to be interacted with, (e.g., controlled, filtered, renamed, tagged, identified, etc.) to those within a given room. This enables a simple/logical smart naming convention based on a room identifier prefix that can be implemented automatically once the room prefixes are identified (e.g., entered by a user, chosen by system).

In the various embodiments, user-interface solutions may be provided based on the discovery of nearby smart objects by a control device using high frequency sound signals, which may include ultrasound signals. In an embodiment, the smart objects in the room may be determined such that only those objects are listed in a user interface. In a further embodiment, the control device may be configured to enable a user to address and control a smart object simply by pointing the control device at the smart object before interacting with a user interface.

Responsive to the control device emitting an RF request to all smart objects to identify themselves via sound signals, a subset of smart objects that are nearby, particularly those in the same room, may be determined by the control device from the sound signals received from those smart objects. A user interface presented on the control device may list the nearby objects, which may be a subset of all known smart objects, based on IDs were received in response sound signals may be created. Because the list of networked smart objects in a user interface display determined based on received sound signals will be limited to only those within the same room as the control device, the user may be provided with a short list of the smart objects that the user can see. Room-specific interactions with those smart objects may be thereby enabled, such as turning on all lights in the room in which the person is present.

In the various embodiments, a user may interact with a smart object by "pointing" a control device at a smart object to identify and select the smart object, send the individual control commands or initiate actions to the smart object via the networking framework, such as via RF signals (e.g., WiFi messages addressed to the smart object). To enable pointing, the sound signals transmitted by the smart objects may be received through two or more microphones spaced apart on the smart device. A direction or relative bearing to each smart object may be calculated based on the relative time of arrival of the sound signals between each microphone. The position, location, or bearings associated with a sound source may be determined through triangulation, trilateration, multilateration, or other location calculation approaches. Once determined, the positions or locations of the smart objects may be stored in a database on the control device or in a node in a network. Triangulation is a simple trigonometric calculation where angle information is determined based on factors such as the time differences between the relative times of arrival, distance between microphones, and so on. Trilateration is a location determining approach based on comparing information associated with ranging information for three or more devices, such as transmitters. Multilateration is a location determining approach based on the measurement of the difference in distance to devices at known locations, which may broadcast signals at known times. By measuring the difference in distance between two devices a curve of locations that satisfy the measurement may be developed. Additional measurements may be taken from different devices at different locations. Over time, additional curves may be developed. To locate a more precise location of a device, a multilateration approach may compare various curves and locate points where the curves intersect. Other approaches may be used such as comparing approximations of the distance between the transmitter and receiver and determination of relative angles from the distance information and possible other information In order to determine the smart objects at which the device is pointing, or to provide input to the location calculation of the smart objects, the orientation of the smart device may be determined by a device processor based on information from accelerometers or gyroscopes within the device or from other information. In other examples, the smart objects may receive sound signals from other smart objects and provide relative position calculations in order to more fully develop location profiles of objects within a space.

For example, a control device having two microphones may be configured with software to determine a relative direction to the object. A control device having three or more microphone may be configured with software to determine a three-dimensional direction to the smart object. The determined bearing to each responding smart object may be correlated to a list or subset of nearby smart objects stored in a memory of the control device. The operations of querying smart objects, receiving sound signals and building a table of their IDs and relative bearings stored in memory of the control device may be repeated frequently so that the relative bearings may be updated or confirmed as the user moves around. In the various embodiments, the control device may use relative bearings received as the user moves around a room to build a table of the absolute locations of the smart objects. Using a table of the absolute locations of the smart objects, the smart device may calculate the directions/relative bearings to each smart object based on its current location in the room.

A user interface that enables interactions with smart objects through pointing of the control device may use a table of relative or absolution locations of smart object by determining a pointing direction of the control device based on signals from an internal accelerometer, gyroscopes , or similar device. The determined pointing direction may be compared with the table of smart object IDs and relative bearings/locations to identify the smart object located close to the pointing direction. The ID for the identified smart object may be used to address an RF message sent via the networking framework, such as via an RF AllJoyn® network, to control or initiate an action with that particular smart object. For example, from the user perspective, it appears that the user merely points their smartphone executing a control device application at the desired object and presses a virtual key on the touchscreen to interact with and control the object.

In the various embodiments, a networking framework may enable any action to be initiated on the smart object, such as controlling a dimming level of a smart light bulb, turning a smart light bulb on or off, and so on. In an example, object naming for one or more smart objects may be accomplished through pointing to and selecting the smart objects in a room (e.g., Room 1). The objects may then be renamed, such as by changing identifying information as a group to include a room specific prefix or suffix that is prepended or appended as a generic name (e.g., Room 1 smart object1, Room 1 SmartObject2, . . . ; SmartObject1 Room1, SmartObject2Room1, etc.). Alternatively, renaming may involve changing the identifying information of the objects such that the objects may be configured with meta-data that further defines the location of the objects. For example, a data field in the identifying meta-data information sent by the smart object may contain location or room identifying information. In some embodiments, renaming may involve changing the identifying information of the objects such that the objects may be configured with a tag that facilitates room-specific, group-specific, or other specific identification, while the object name remains unchanged. In another example, a user may point to a smart object, press a virtual key and then type in a desired new name, tag, identifier, or metadata for the object. These actions may cause the control device to implement actions via the networking framework to revise or replace the generic name assigned to that smart object during a registration or onboarding process, or to add or change other identifying information such as a tag, identifier, metadata, etc. In another example, the smart objects may provide a confirmation of correct pointing, by providing visual feedback such as blinking. In some instances, the visual feedback may be accompanied by a confirmation message on the RF channel or the audio channel.

The various embodiments may be implemented within a variety of communication systems, such as the example communication system 100 illustrated in FIG. 1A. In an embodiment, a communication system 100 may include a control device 120, such as a mobile communication device (e.g., smartphone, tablet, etc.). The control device 120 may control one or more smart objects 110 (e.g., smart objects) through links 111, 121 established with an access point 130 (e.g., wireless access point, wireless router, etc.). The links 111, 121 may be wireless, or may be wired such as in an Ethernet connection or a power line communication (PLC) connection, or other wired connection. In an alternative embodiment or embodiments, the control device 120 may connect directly with the smart object 110 through a direct link or connection 101. Further in an alternative embodiment or embodiments, the smart objects 110 may connect with each other, either through a direct link (e.g., connection 101) or through a link or links provided through the access point 130. The access point 130 may be connected to the Internet 102 through a service provider 131. In some embodiments, a local network server 140 may be present in the network and may be incorporated into a networking framework.

In various further alternative embodiments, the control device 120 may connect to the network, the smart objects, and/or other devices through a cellular infrastructure 103, which may refer collectively to cellular infrastructure components for providing cellular service. The cellular infrastructure 103 may include a component or series of components, which may include some or all of as a cellular antenna, base station (e.g., eNodeB), and so on. The control device 120 may connect to the access point 130 through a connection provided by the cellular infrastructure 103 through a public network such as the Internet 102, or a private network based on a Universal Resource Locator (URL) associated with the access point 130. For security reasons, access to the network through the access point 130 may be password protected, may use encryption, may use other security measures or may use a combination of security provisions. Alternatively or additionally, the control device 120 may connect directly to the smart objects 110 through a network connection provided by the cellular infrastructure, such as in a private network, a peer-to-peer (P2P) network, a device-to-device (D2D) network, etc. As will be described in greater detail below, a networking framework may provide APIs to implement security at the application layer. By providing a security API, the details of the specific hardware for control devices and smart objects may be handled within the networking framework without the need to understand detailed platform-specific implementations.

Figure 1B:
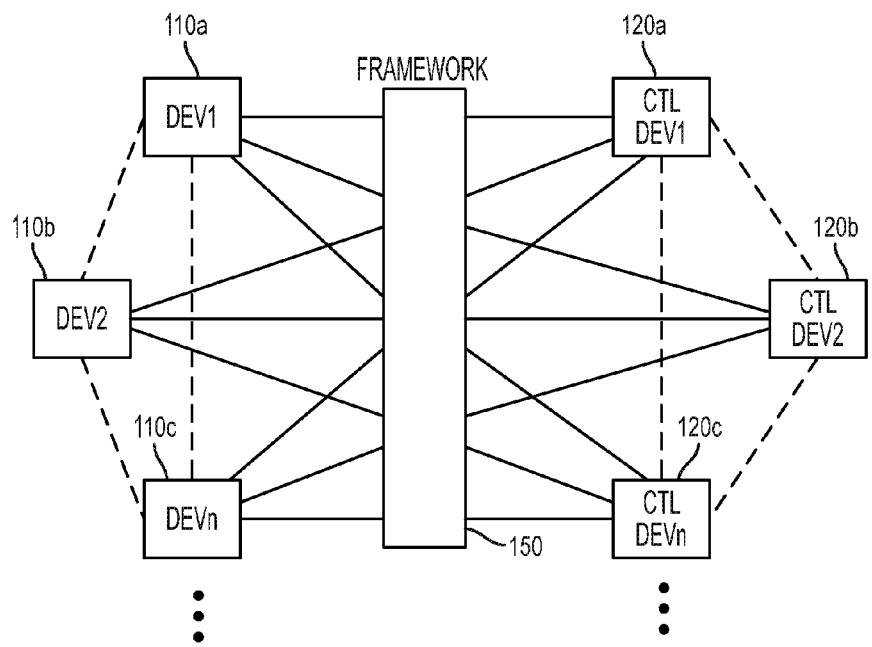
FIG. 1B is a illustrating a networking framework, control devices and smart objects suitable for use with the various embodiments.

In the various embodiments, interconnections between the control device 120 and the smart objects 110 may be established through a networking framework 150 as illustrated in FIG. 1B. One or more smart objects 110 such as a DEV 1 110a, a DEV 2 110b, a DEV n 110c, may be coupled to one or more control devices such as a CTL DEV 1 120a, a CTL DEV 2 120b, and a CTL DEV n 120c. In FIG. 1B, the solid lines illustrate that, in some embodiments, all of the smart objects 100 may be connected to each other through the networking framework 150. Interconnection through the networking framework 150 may require that smart objects be registered with the networking framework as will be described in greater detail hereinafter. In addition, in some embodiments the control device 120 may also require registration with the networking framework. In various embodiments, the dotted lines illustrate that at least some of the smart objects 110 may be connected directly with each other. Direct connections between the smart objects 110 may be compatible with the networking framework 150 as ad hoc connections may be established between smart objects 110 that are not capable of accessing the networking framework 150 directly, such as through an access point. Alternatively or additionally, the smart objects 110 may establish ad hoc or direct connections under the framework 150 in addition to framework connections that are established using an access point. In such examples, one smart object may provide another smart object with access to the networking framework 150 through a direct connection between the smart objects, provided that at least one of the smart objects has access to a network connection. Network access is important to allow smart objects 110 to be controlled by control devices 120. Alternatively, the smart objects 110 and the control devices 120 may establish networks (e.g., peer-to-peer (P2P), device-to-device (D2D), etc.,) by direct connections (e.g., connections 101).

Figure 2A:
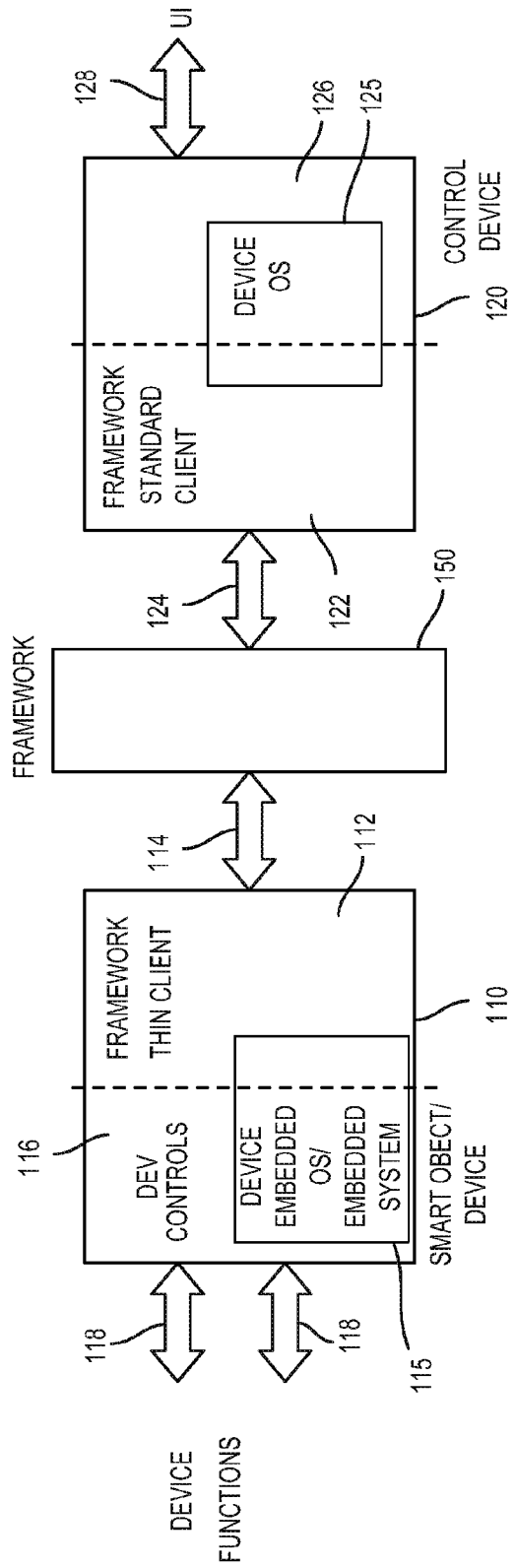
FIG. 2A is a diagram illustrating components for interacting with objects by a control device in a smart object network using a networking framework suitable for use with the various embodiments.

In the various embodiments smart object configurations in a networking framework 150 may be implemented as illustrated in FIG. 2A. The networking framework 150 may refer to the core aspects of the networking framework, such as the AllJoyn® framework. The networking framework 150 provides client services to the control device 120 and the controlled object or objects such as the smart object 110 and represents a distributed software bus architecture that enables the control device 120 to control the controlled smart object 110 through a framework connection 124 and 114, and a series of APIs, SDKs, and other software mechanisms. The framework connections 124 and 114 may be considered as parts of the distributed software bus. In one aspect, the networking framework 150 allows applications to interact through a series of universal high level software mechanisms.

Applications that are compatible with the networking framework 150 may be connected to the networking framework 150 (e.g., software bus). In an AllJoyn® framework, for example, such applications may be referred to as a Bus Attachment. A Bus Attachment may be any type of application and may have a unique name. The unique name may be automatically assigned when a Bus Attachment is connected to the AllJoyn® Bus (e.g., during Onboarding). The Bus Attachment may create Bus Objects, which may identify themselves to other Bus Objects using a process of Advertising to broadcast their existence. A Discovery process allows a Bus Object to determine the existence of other Bus Objects. A Bus Object may access services provided by other AllJoyn® Bus Attachments.

In the various embodiments, the control device 120 may be configured with a networking framework standard client 122 that provides direct or indirect access to the resources of the control device 120. Access for the networking framework standard client 122 may be provided through access to the control device operating system 125 and the hardware (and software) resources of the device platform 126 of the control device 120. The resources may include access to a processor, memory, and a user interface 128, which may include display resources and input resources (e.g., hard or soft keyboard, touchscreen, mouse, camera, microphone(s), accelerometer, etc.).

A smart object 110 that may be controlled, such as a smart bulb, a smart appliance, or other device configured as a smart object, typically has limited processing resources. In the various embodiments, such a smart object 110 may be configured with a networking framework thin client 112, which provides direct or indirect access to the resources of the smart object 110. Access for the networking framework thin client 112 may be provided through access to the smart object embedded operating system or embedded system 115. In a situation where the smart object 110 has extensive processing resources, the smart object 110 may nevertheless be equipped with the networking framework thin client 112. The thin client 112 may be provided when the smart object 110 is primarily configured to be a controlled device. However, when the smart object 110 can also operate to control other smart objects, the smart object 110 may be configured as a control device 120 with the networking framework standard client 122. In some embodiments, the smart object 110 may not have sufficient resources to complete processing tasks. In such situations, processing requirements may be distributed to other clients, such as the networking framework standard client 122 on the control device 120, or to other smart objects or control devices.

The networking framework thin client 112 on the smart object 110 may further have access to the functions or services 118 provided by the smart object 110. The functions or services 118 may be actions that can be controlled by the control device 120, such as dimming or turning on and off a smart bulb, starting a brewing cycle on a smart coffee makers, and so on. The functions or services 118 may further include providing status indications or notifications to the control device 120, such as that the brewing cycle on the smart coffee maker is complete. Alternatively, or in addition, the smart object 110 may provide information about the capabilities of the smart object 110, such as its functions or services 118 that are available.

In the AllJoyn® framework example, the AllJoyn® Thin Client (AJTC) provides the distributed programming environment to the generally limited resources of a smart object 110 configured as an embedded system. Since the operating environment in which an AJTC operates may be very constrained, an AllJoyn® component, such as a Bus Object must live within the system constraints. The AllJoyn® Standard Client (AJSC) may be configured to take advantage of the features of high performance processors typically installed in control devices, such as multi-threading capabilities. However smart objects running the AJTC typically do not have such resources. Thus, an AllJoyn® daemon, which typically accompanies the AJSC and requires multi-threading, handles many network connections, and uses relatively large amounts of memory may not be provided in the AJTC. Other enhanced aspects of the AJSC are also not available in the AJTC, such as the ability to run an object-oriented programming environment that includes alternate language bindings. Accordingly, the AJTC is configured as a Bus Attachment having data structures corresponding to interfaces, methods, signals, properties of the smart object. Bus Objects in the AJTC may be highly optimized for efficient use of memory space. Thus, the APIs in the AJTC are typically different from those provided in the AJSC. Although the APIs may be different in the AJTC, all of the major conceptual blocks of the AllJoyn® framework that are found in AJSC can be found in AJTC systems in a compact form. In some instances, some Bus Objects may be configured to run remotely on another, more capable machine.

Figure 2B:
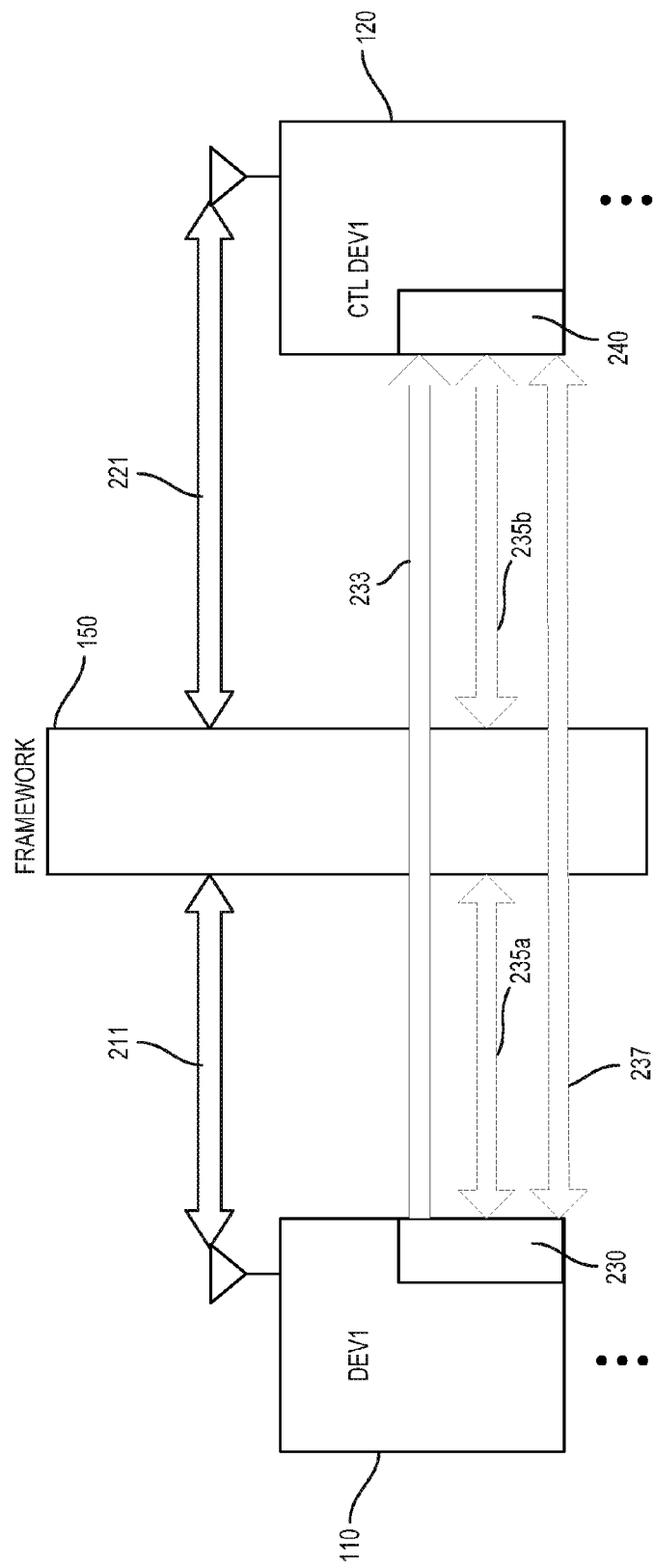
FIG. 2B is a diagram illustrating components of a smart object network, including a control device, a smart object and a networking framework suitable for use with the various embodiments.

In the various embodiments, communications between smart objects and control devices may use a secondary communication channel, as illustrated in FIG. 2B. As discussed, by using an RF channel for certain networking framework communications, all smart objects within a home or facility may be addressed. In some instances, receiving RF communications from all smart objects may be disadvantageous. A user may be unable to identify specific smart objects targeted for interactions based on a large number of generically named smart objects appearing on a user interface of a control device. Accordingly, a control device 120 may be provided with a secondary communication module 240, and a smart object 110 may be provided with a secondary communication module 230. The secondary communication modules 230, 240 may enable room-specific communications between the control device 120 and the smart object 110. The secondary communications modules 230, 240 may use an audio communication channel, an ultrasound communication channel, or other communication channel/technology that limits the range of communications to within a room.

In some embodiments, using ultrasound as the secondary communication mechanism, the secondary communication module 230 may include an ultrasound emitter. The smart object 110 may encode information on a signal that is transmitted as an encoded ultrasound signal on the ultrasound emitter. The secondary communication module 240 may include one or more ultrasound receivers. With two or more ultrasound receiver elements, the secondary communication module may be equipped to provide additional information regarding the relative position of the source of the received ultrasound signal. For example, with two ultrasound receiver elements (e.g., microphones) the control device may establish at least a relative bearing or direction of the ultrasound emitter, with three ultrasound receiver elements, the control device may establish at least a three-dimensional position of the emitter. With a single ultrasound receiver element, the control device may determine the distance to the ultrasound emitter.

In other embodiments, a reverse architecture may be employed whereby the smart objects 110 may be equipped with additional ultrasound emitters or transmitters. In such embodiments, angle information associated with the smart object 110 may be estimated by receiving the signals from the multiple emitters in the control device using one or more receiving elements. Alternatively or in addition, the control device may transmit ultrasound signals from one or more emitters and the smart object 110 may receive the signal with an ultrasound receiver or receivers. The smart object 110 may calculate or estimate its position based on reception of an ultrasound signal or signals from the control device using an ultrasound receiver or receivers. In some embodiments, the position information calculated in the smart object 110 may be transmitted back to the control device, such as on an RF channel.

In the various embodiments, the control device 120 may be coupled to the networking framework 150 through a connection or link 221, which may represent a connection from the control device 120 to the distributed software bus associated with the networking framework 150. The smart object 110 may be coupled to the networking framework 150 through a connection or link 211, which may represent a connection from the smart object 110 to the distributed software bus associated with the networking framework 150. The connections or links 221 and 211 may be carried out through an RF connection to a network element such as an access point 130. In the illustration of FIG. 2B, the networking framework 150 may be representative of the interoperation of components of a standard client operating on the control device 120 and the operation of a thin client on the smart object 110.

The secondary communication modules 230, 240 may provide a secondary communication channel between the smart object 110 and the control device 120. The secondary communication channel may be a direct communication channel 233 that may represent the smart object 110 sending an ultrasound signal from the secondary communication module 230 to the secondary communication module 240 of the control device 120. In some embodiments, the secondary communication modules 230 and 240 may provide a secondary communication channel that is within the networking framework 150. The secondary communication channel may include a channel 235a and a channel 235b between the networking framework 150, the smart object 110 and the control device 120. In such a case, the smart object 110 may transmit an ultrasound signal from the secondary communication module 230 through interactions with a networking framework thin client operating on the smart object 110. The ultrasound signal may be received by the control device 120 through the channel 235b and may be processed within the networking framework standard client operating on the control device 120. The channels 235a and 235b are illustrated as bi-directional considering that in examples, the smart objects may conduct bi-directional communications either through the secondary communications modules 230 and 240 or through a combination of communications through the primary channels (e.g., links 211, 221) and the secondary channels (e.g., the channels 235a, 235b). The bi-directionality of the secondary channels 235a and 235b may be further used to calculate or estimate separation distances. For example, the control device 120 may transmit an ultrasound signal that may be received by the smart object 110, which may transmit a response after a predetermined delay time. The handset may use the time of reception of the response plus the predefined delay to calculate the round trip delay, which may be used to calculate the separation distance knowing the speed of sound in air. In further examples, the control device 120 may provide credential information, such as information required to access a WiFi access point through a communication on one of the channels 235a and 235b.

Figure 2C:
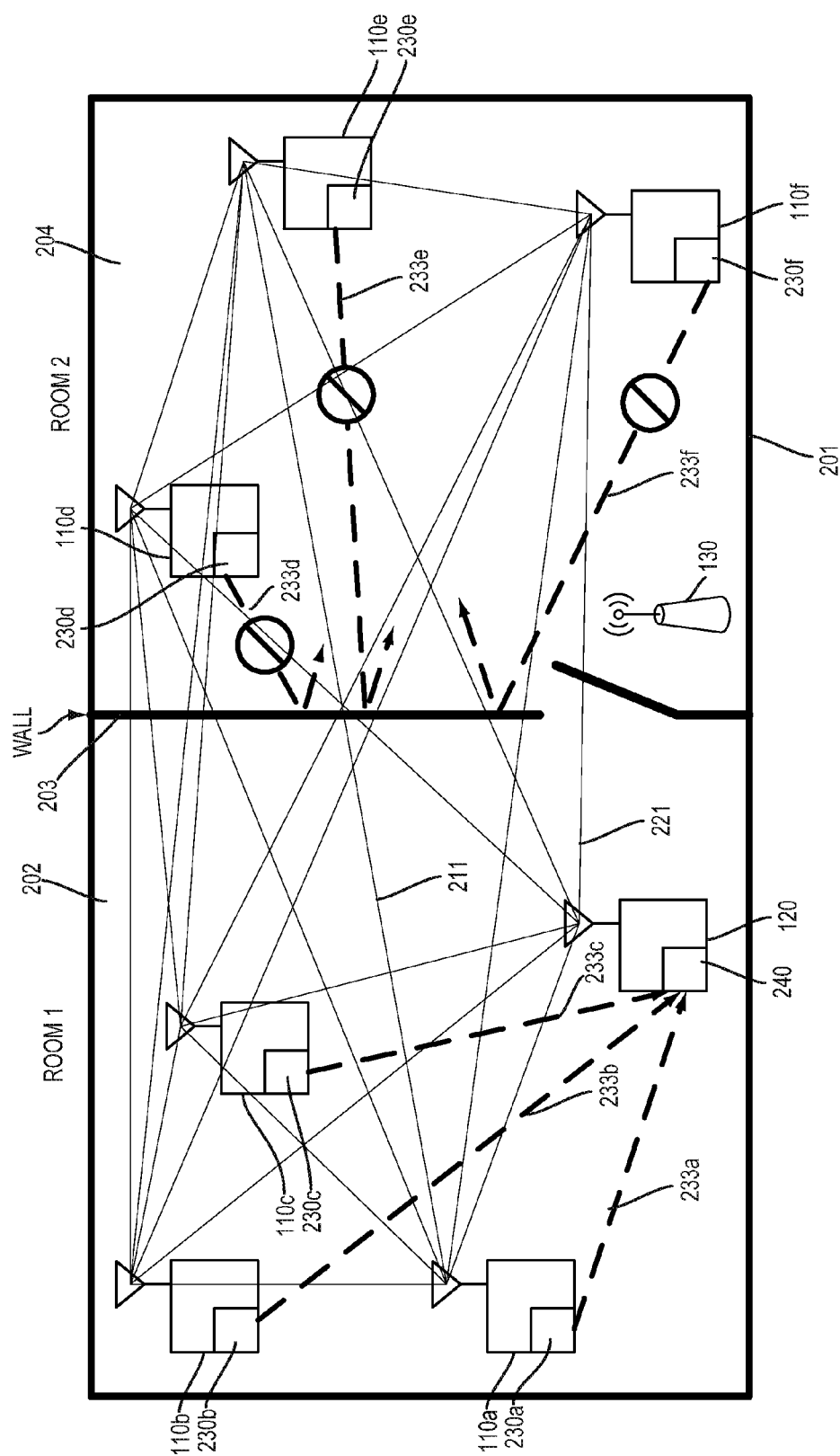
FIG. 2C is a diagram illustrating interactions of radio frequency (RF) and acoustic communication paths between a control device and smart objects in different rooms in the various embodiments.

Continuing with an ultrasound example, advantages may become apparent with reference to FIG. 2C, which illustrates smart objects distributed in two defined areas, such as rooms, in a facility 201 such as a home, a business, or other facility having defined areas. The smart objects 110a-110f are illustrated in FIG. 2C as distributed throughout the facility 201 in defined areas, such as a Room 1 202 and a Room 2 204, which are separated by a wall 203. While a wall 203 is illustrated, separation of a defined area from other areas may also be by floors, ceilings, doors, or other separation structures. Specifically, smart objects 110a, 110b, and 110c are illustrated as being distributed in Room 1 202, and smart objects 110d, 110e, and 110f are illustrated as being distributed in Room 2 204. A control device 120 is illustrated as located in the Room 1 202. The access point 130 may be present within the facility 201 and may established wireless connections with the smart objects 110a-110f and the control device 120. The smart objects 110a-110f may be equipped with respective secondary communication modules 230a-230f, which in the present example may be ultrasound modules configured for emitting ultrasound signals. The control device 120 may be equipped with a secondary communication module 240, which in the present example may be an ultrasound module configured for receiving ultrasound signals. The various RF connections between the smart objects 110a-110f are shown as the links 211, but for ease of illustration and description, only one example of the links 211 is labeled. The connections between the control device 120 and the smart objects 110a-110f are shown as the links 221, but for ease of illustration and description, only one example of the links 221 is labeled. For further ease of illustration and description, the individual links between the access point 130, the smart objects 110a-110f and the control device 120 are not shown or described. However, the links 211, 221 may represent physical or logical (i.e., networking framework) links that are facilitated through the access point 130.

In some embodiments, the control device 120 may send an RF signal to the smart objects 110a-110f on the RF communication channel (e.g., the link 221) requesting the objects to identify themselves via a secondary communication channel, such as ultrasound signals (for example). In response to receiving such a request message, each of the smart objects 110a-110f may transmit an ultrasound signal 233a-233f from their respective secondary communication modules 230a-230f. Alternatively or in addition, the control device 120 may send an RF signal that identifies subsets of the smart objects 110a-110f, such as specific device types (e.g. Smart Bulbs). In response to receiving such a request message, some of the smart objects 110a-110f, such as those smart objects that have been identified in the RF signal, may transmit an ultrasound signal. In other examples, devices may respond or not respond to an RF request based on other factors. For example, some devices may have been deliberately turned off or disabled. Such devices may not respond to an RF request or may respond with an indication that they are not active.

Ultrasound signals are generally considered to be acoustic signals with a relatively high frequency, such as a frequency above 20 KHz. As ultrasound signals propagate through various materials or media, the ultrasound signals may be altered or blocked due to absorption, attenuation, scattering and other phenomenon. For ease of description, a detailed explanation of the mechanics of ultrasound propagation is omitted. However, it is generally accepted that ultrasound and other high-frequency audio or acoustic signals do not propagate easily through dense materials such as walls and floors. In some embodiments, a frequency lower than the "ultrasound" band (i.e., less than 20 KHz) may be used, such as a frequency of between 10 KHz and 20 KHz. In such embodiments, depending on acoustic power levels, the high frequency sub-ultrasonic signals may fall outside the perception of some individuals. For example, older individuals are typically less sensitive to high frequency sound, particularly audio frequencies above 10 KHz compared to while younger individuals. In some embodiments, an audio frequency less than 20 KHz used for the secondary communication channel may be selected based on additional considerations, such as the age range of the persons using the facility.

Thus, the control device 120 may receive the ultrasound signals 233a-233c from the smart objects 110a-110c located in the Room 1 202 using the secondary communication module 240. However, the ultrasound signals 233d-233f cannot propagate through the wall 203, and therefore the control device 120 receives only those ultrasound signals 233a-233c from the Room 1 202. For ease of description, the wall 203 is used in examples as blocking ultrasound signals. However, ultrasound signals may also be blocked by floors, objects, or other materials or structures. In some embodiments, the secondary communication module 240 may be specifically configured, such as with a threshold detection level, such that even if attenuated some instances of the ultrasound signals 233d-233f do propagate through the wall 203, they will be ignored by the control device 120 (e.g., if the received volume is below a threshold volume). Alternatively, if attenuated signals are received, the control device 120 may conclude that the smart objects 110d-110f are located in a different room based on the attenuated (i.e., sub-threshold) signal levels received in the secondary communication module 240, and not include those smart objects in a renaming, tagging, identifying, or related operation.

Figure 3A:
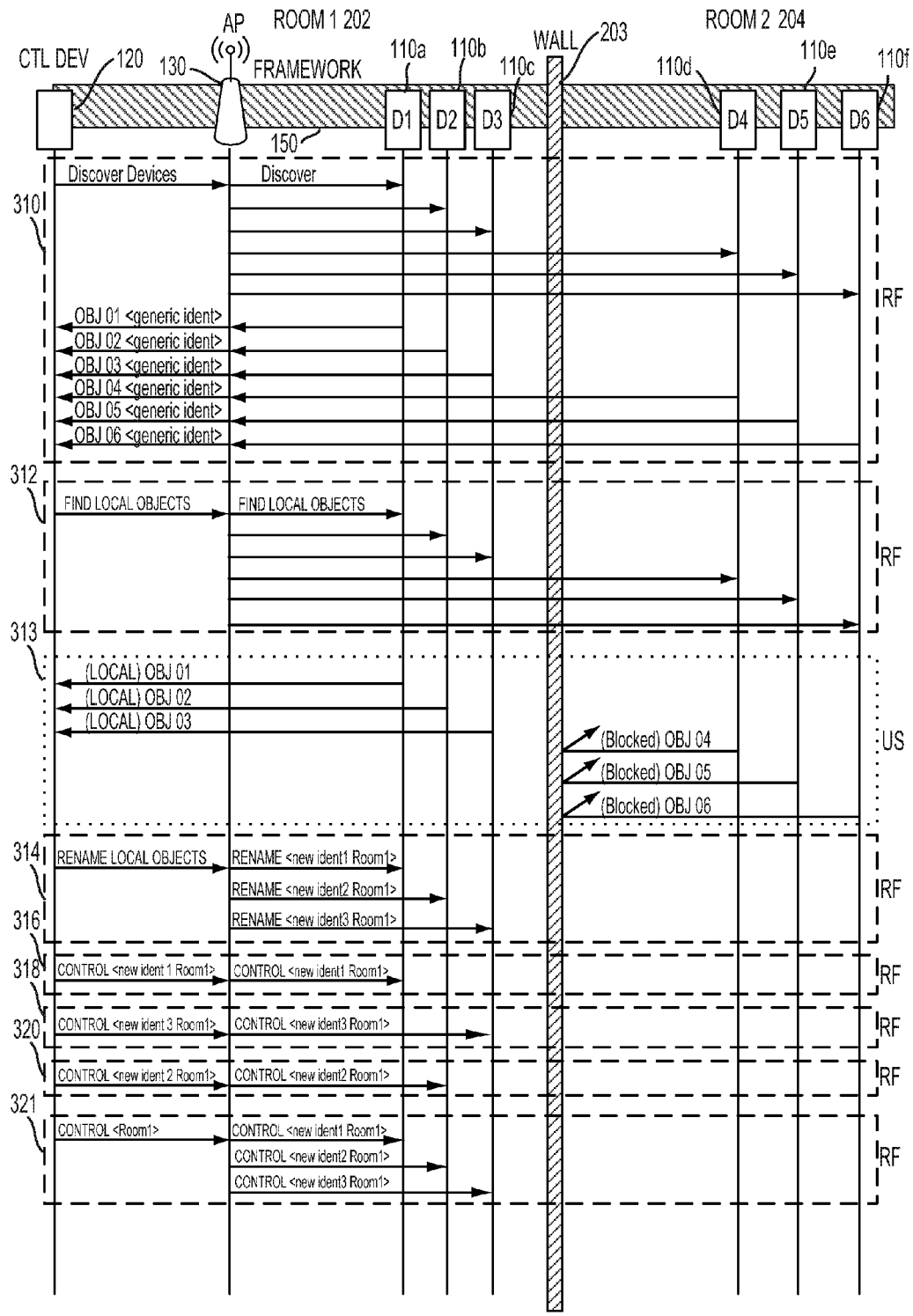
FIG. 3A is a message flow diagram illustrating communication interactions between a control device, access point, and smart objects in different rooms for renaming.
Figure 3B:
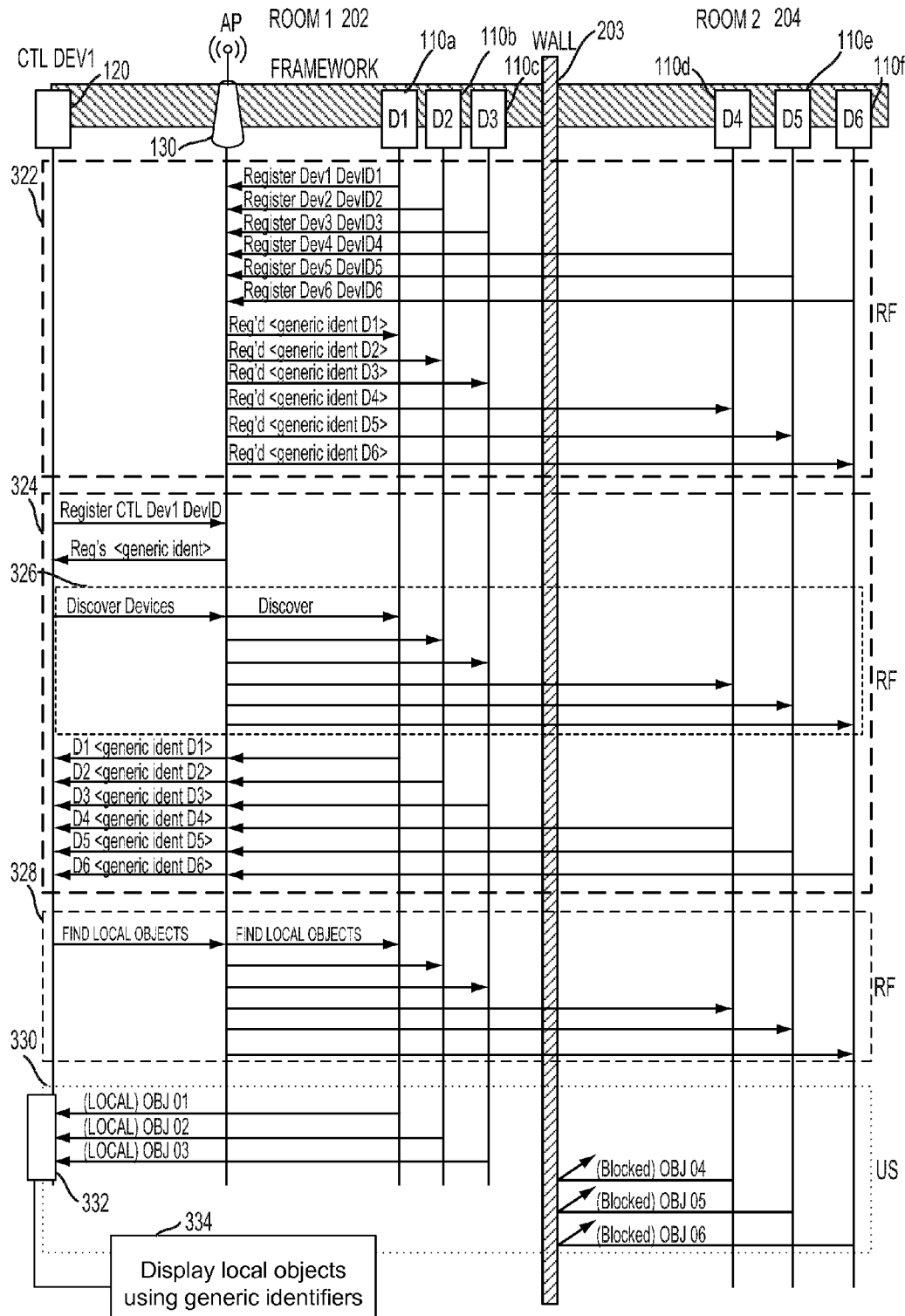
FIG. 3B is a message flow diagram illustrating communication interactions between a control device, access point, and smart objects in different rooms for networking framework registration.
Figure 3C:
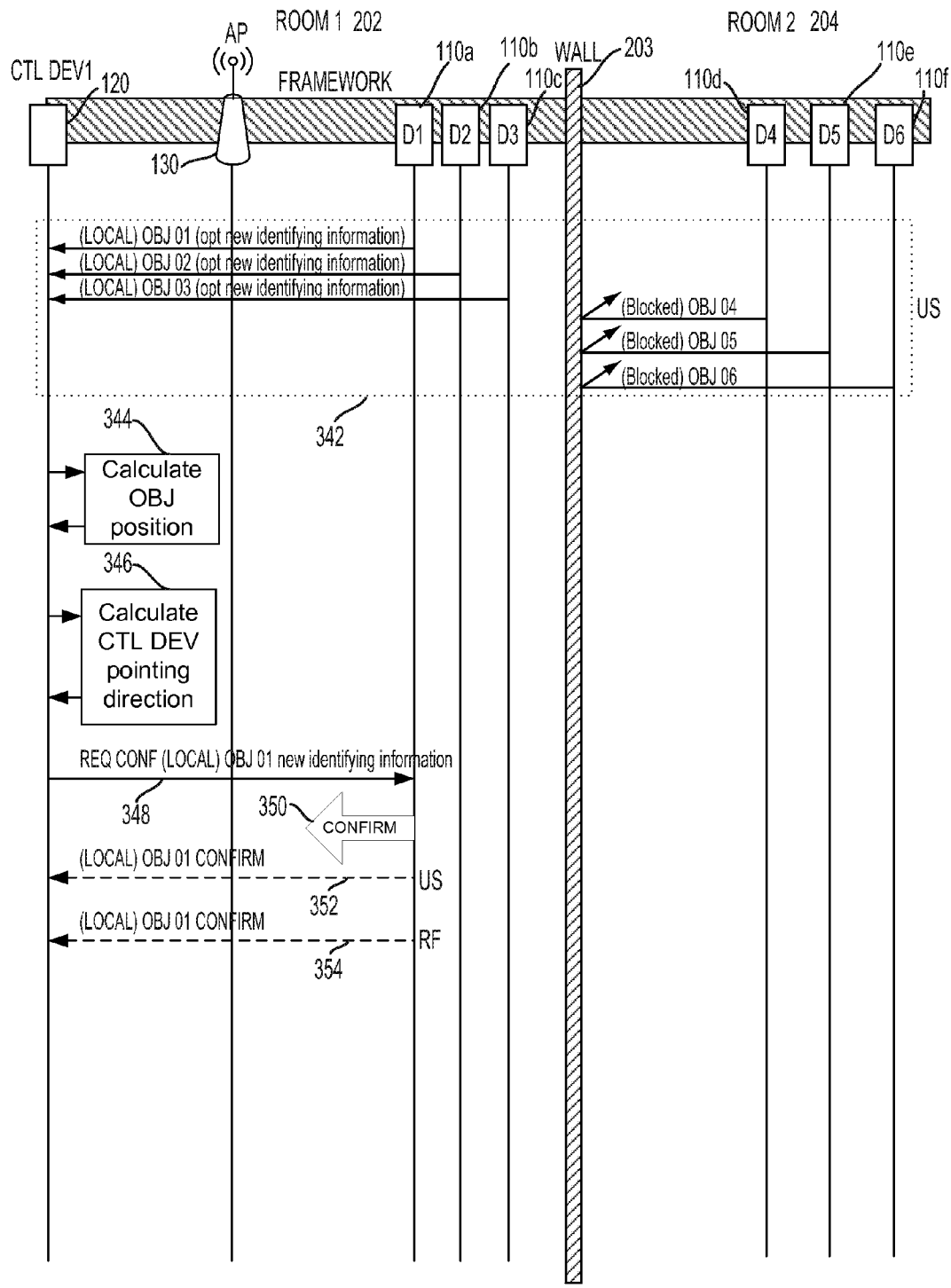
FIG. 3C is a message flow diagram illustrating communication interactions between a control device, access point, and smart objects in different rooms for pointing and control.

Communications between the control device 120 and the smart objects 110a-110f are further illustrated in FIG. 3A. The control device 120 and the smart objects 110a-110f may establish physical connections to a network through the access point 130. Such connections may also provide a logical connection to the networking framework 150. The control device 120 may be equipped with the networking framework standard client associated with the networking framework 150, and the smart objects 110a-110f may be configured with the networking framework thin client associated with the networking framework 150 as previously described. The networking framework 150 may provide a series of APIs that enable the various smart objects and networking framework clients to send and receive messages defined in the networking framework for various actions required for interoperation. In a message sequence 310, which may be associated with an RF communication channel, the control device 120 may transmit a message such as a discovery request message to discover the smart objects currently registered with the networking framework 150. The discovery request message may be broadcast to all of the smart objects 110a-110f through operation of the networking framework 150.

In response to the discovery request message, the smart objects 110a-110f may respond with messages that identify each device by its identifier or generic name. For example the device D1 110a may respond as "OBJ 01," which represents the <generic name> of the device D1 110a. The device D2 110b may respond as "OBJ 02," which represents the <generic name> of the device D2 110b, and so on, to the device D6 110f, which may respond as "OBJ 06" representing the <generic name> of the device D6 110f. In some embodiments, the messages from some or all of the smart objects 110a-110f may include an identifier used in another network or framework mechanism to refer to the object (e.g., a WiFi identifier). The messages from some or all of the smart objects 110a-110f may further contain information about the manufacturer, model number, ratings, and so on. The messages from some or all of the smart objects 110a-110f may further contain information necessary for the control device 120 to access the smart object, such as an SSID/password. The messages from some or all of the smart objects 110a-110f may further contain information regarding whether the smart object or objects have been onboarded or otherwise registered with the networking framework, and so on. In some embodiments, the messages from some or all of the smart objects 110a-110f may contain information representing a combination of the above information and other information.

When all of the smart objects are discovered the control device 120 may display the generic names of the smart objects on a user interface display. Because the control device 120 may be presently located in the Room 1 202, the number of smart objects that respond to the request may exceed the smart objects that are visible in the Room 1 202 and may confuse the user of the control device 120 as to which of the device are and are not located in the Room 1 202.

In the various embodiments, in lieu of, or in addition to conducting the device discovery in the message sequence 310, the control device 120 may transmit a request for the smart objects 110a-110f to identify themselves through respective secondary communication channels in a message sequence 312 that may be associated with an RF communication channel. In response to the message sequence 312, the smart objects 110a-110f may respond through secondary communication channels by sending respective ultrasound signals in message sequence 313 that may be associated with an ultrasound communication channel or channels. The control device 120 receives the ultrasound signals from only the smart objects D1 110a, D2 110b, and D3 110c in the same room. The control device 120 does not receive the ultrasound signals from the smart objects D4 110d, D5 110e and D6 110f in another room due to the signals being blocked by the wall 203. In response to the reception of only the ultrasound signals from the smart objects D1 110a, D2 110b, and D3 110c in the same room, these smart objects may be highlighted on the user display. In some examples, additional smart objects from which ultrasound signals were not received, such as the smart objects D4 110d, D5 110e and D6 110f in another room, are not displayed. Thus, the list of smart objects within Room 1 can be effectively "filtered" from the complete list of smart objects that may be interacted through the networking framework.

In the various embodiments, when the control device 120 has a filtered list of smart objects within the Room 1 202, or a list in which only those smart objects are highlighted, the smart objects may be renamed in a message sequence 314 that may be associated with an RF communication channel. The control device may transmit a message to rename the smart objects D1 110a, D2 110b, and D3 110c in the same room with a prefix or suffix associated with the room (e.g., Room 1). As discussed above, "renaming" may refer to adding or changing identifying information associated with the smart object, such as changing a default name or a current name associated with the smart object, adding a tag, metadata, or identifier to information associated with the smart object, or another change (or combinations of changes) to information associated with identifying the smart object. Thus, the generic device name may be transformed into a room-specific name, a room-specific tag may be added to identifying information, and/or room-specific metadata may be added to the identifying information associated with the smart object with or without changing the generic name. Other options are possible. While the name "Room 1" is used as a generic example, the room name may be descriptive of the actual room (e.g., "LivingRoom," "Bedroom," "Kitchen," etc.). Alternatively or additionally, the control device 120 may rename the smart objects to add more specific information about the actual device such as "EndTableLampLivingRoom," "OverheadLampLivingRoom," and so on based on confirming the specific identities of each device, such as through pointing and confirmation, which is described in greater detail hereinafter. When the smart objects are renamed, the networking framework definitions may also be updated to reflect the new identifying information such as the new names, new tags, new identifiers, new metadata or other identifying information. For example, as part of a "Rename" API provided with networking framework components, the networking framework may automatically update references to the device to reflect the new identifying information such as the new name, tag, identifier, metadata, and so on.

In some embodiments, when the control device 120 has renamed the smart objects with new identifying information such as new names descriptive of the rooms and actual smart objects, and/or has added tags, identifiers, metadata or other identifying information, the control device 120 may interact with the smart objects. The control device 120 may interact individually with each object by using the new identifying information of each object as a messaging address associated with an RF communication channel, as shown in message sequences 316, 318 and 320. In some embodiments, the control device 120 may further interact with the objects as a group by reference to the room name, as shown in message sequence 321 that may be associated with an RF communication channel.

In order to be recognized within the networking framework 150, the smart objects, including the smart objects 110a-110f and the control device 120, must register with the networking framework. For example, in the AllJoyn® framework registration is conducted through a process known as "Onboarding." In some embodiments, each device (such as the smart objects D1 110a, D2 110b, D3 110c, D4 110d, D5 110e, and D6 110f) may transmit a registration request message to the networking framework 150, such as by sending a message on an RF communication channel through the access point 130 in a message sequence 322. In some embodiments, the access point 130 may be configured with a networking framework component that may be used to track and record the registration of networking framework objects. In some embodiments, the control device 120 may transmit a registration request message in order to register with the networking framework 150 in a message sequence 324. The control device 120 may transmit a message on an RF communication channel through the access point 130.

As part of the networking framework registration, the control device 120 may receive all of the currently onboarded objects, such as the smart objects 110a-110f. Alternatively or additionally, the control device may send a discovery request message in a message sequence 326. Upon receipt of the message the smart objects may be identified to the control device 120.

In some embodiments, the access point 130 may be equipped with a networking framework component such that a message need not necessarily be sent to each device. Rather, the access point 130 may update the control device 120 with the generic names of the registered objects (e.g., smart objects). The networking framework component of the access point 130 may further notify the smart objects of the registration of the control device 120. Alternatively, the control device 120 may notify or advertise its presence within the networking framework 150. As in the message sequence 312 in the previous example, when the control device 120 has discovered and displayed all of the currently registered smart objects, a request may be transmitted for the smart objects 110a-110f to identify through respective secondary communication channels, as shown in a message sequence 328 that may be associated with an RF communication channel.

In response to the message sequence 328, the smart objects 110a-110f may respond through secondary communication channels by sending respective ultrasound signals in message sequence 330 that may be associated with an ultrasound communication channel or channels. The control device 120 receives the ultrasound signals from only the smart objects D1 110a, D2 110b, and D3 110c in the same room. The control device 120 does not receive the ultrasound signals from the objects in other rooms because their ultrasound signals are blocked by the wall 203. In response to receiving only the ultrasound signals from the smart objects D1 110a, D2 110b, and D3 110c in the same room, these smart objects may be highlighted on the user display in block 334. In some examples, additional smart objects from which ultrasound signals were not received, such as the smart objects D4 110d, D5 110e and D6 110f in another room, may not be displayed. Thus, the list of smart objects within Room 1 can be effectively "filtered" from the complete list of smart objects which may be interacted through the networking framework. The smart objects may be renamed, tagged, etc., and controlled as described above in connection with the message sequences 314, 316, 318, 320 and 321.

In the various embodiments, the smart objects 110a-110c may transmit signals as previously described using the ultrasound communication channel as shown in message sequence 342. The control device 120 may be equipped with at least two ultrasound receiving elements (e.g., microphones) by which the ultrasound signals may be received. Based on reception of the ultrasound signals, the control device 120 may calculate the position of the objects in the Room 1 202. The control device 120 may further calculate a pointing direction in block 346. The pointing direction of the control device 120 may be calculated using an onboard accelerometer, gyroscope, or other similar device capable of generating a pointing direction of the device. As previously described, the absolute or relative locations of the smart objects may be previously obtained and stored. When the pointing direction is obtained, the control device 120 may compare the pointing direction to a list of stored locations to assist in identifying the device with which the control device wishes to interact. The control device 120 may point to an object and transmit a message 348 requesting confirmation. The request message may contain the new name of the object. The object may respond to the message 348 by a confirmation 350. The confirmation 350 may include a blink or other visually or audibly discernible confirmation that the device to which the control device 120 is pointing corresponds to a smart object listed and highlighted in the display of the control device 120.

In some embodiments, the pointing procedure may be used during a renaming (or tagging, identifying, etc.) process. For example, the user may point the control device 120 at a smart object to be named, such as an end table lamp, and may instruct or prompt the control device to transmit a confirmation request message, such as the message 348. The control device 120 may confirm that the object to which the control device 120 is pointing is the intended object, and rename the object, such as to "EndTableLampRoom1." If locations of the objects or smart objects 110 are already known by the control device 120 or the networking framework 150, the control device 120 may ascertain the identity of the smart object at which the control device 120 is pointing. In such a case, in lieu of, or in addition to providing a confirmation 350, the control device 120 may transmit a confirmation 352 on the secondary communication channel or transmit a confirmation 354 on the RF communication channel.

Figure 4A:
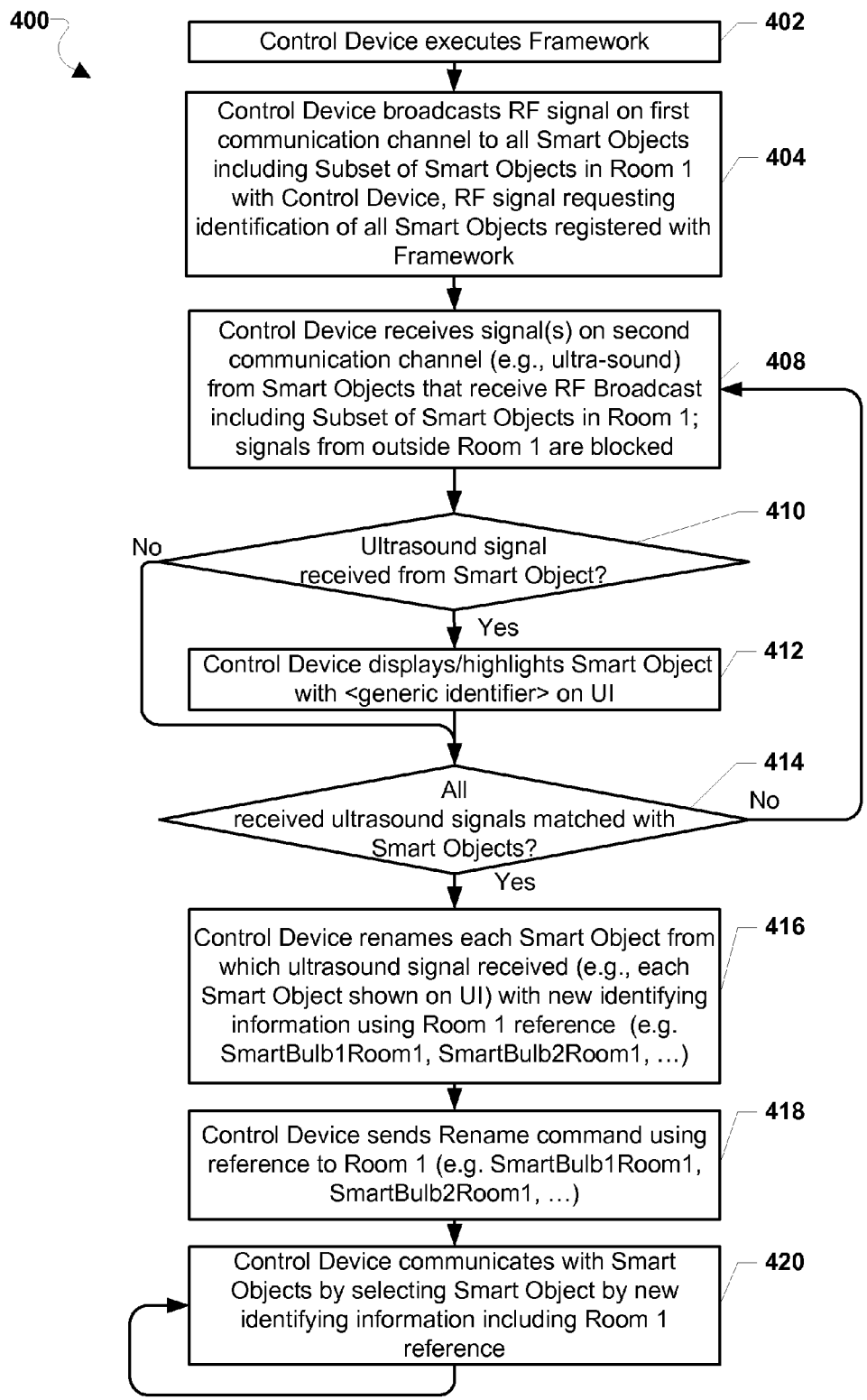
FIG. 4A is a process flow diagram illustrating an embodiment method for renaming smart objects.

An embodiment method 400 for renaming of smart objects or objects within the networking framework 150 is illustrated in FIG. 4A. As discussed, the term "renaming" may refer to any operation that changes the manner in which the smart objects may be identified. For example, renaming may include refer to changing a generic name of the smart object, changing a previously assigned name of the smart object, or changing a default name of the smart object. The "name" may be a value that can be viewed by other devices within the networking framework. For example, in the AllJoyn® framework, the name may be a "friendly name," such as a name that will appears on the user interface of devices connected to the object through the networking framework. Alternatively or additionally, renaming may refer to adding a tag (or "tagging") to information associated with the device, which may assist in identifying the device or similar devices. Alternatively or additionally, renaming may refer to modifying an identifier associated with the smart object other than the friendly name. For example, the identifier may not ordinarily be viewable on a user interface of devices to which the smart object is connected through the networking framework. Alternatively or additionally, renaming may refer to adding or changing metadata associated with the smart object.

To perform the operations of embodiment methods, each of the devices including the control device may be connected through the networking framework as described. In block 402, a processor of the control device 120, may execute a networking framework, such as a networking framework standard client as described herein above. The respective processor or processors of one or more smart objects 110 may also execute a networking framework, such as a networking framework thin client as described above. In some embodiments, the networking framework standard client and networking framework thin client may be All-Joyn® clients. The functions and the operations of the standard client and the thin client may be specified according to various standard code packages, APIs, SDKs or independently developed software packages that are compliant with the current and future technical standards associated with the Allseen Alliance organization. In other embodiments, the standard client and the thin client may perform operations based on software packages of a different origin, which may enable the standard and thin clients to perform operations consistent with those described herein.

In block 404, the processor of the control device may broadcast an RF signal on a first communication channel requesting identification of all smart objects currently registered with the networking framework. The broadcast of the RF signal may be accomplished as a networking framework function that is invoked by an application, such as a framework application or client. The networking framework function, in turn, may cause the processor to invoke the necessary hardware, such as a transceiver, and lower level software actions that may be necessary for actual transmission of the RF signal.

Depending on various implementations, the processor of the control device may send individual requests to smart objects that have registered with the networking framework based on a previous discovery process conducted over the RF communication channel. Thus, in block 404 the processor of the control device may broadcast the RF signal to all smart objects within a home or facility that are registered with the networking framework, including a subset of all the smart objects within a defined area, such as a room (e.g., Room 1) in which the control device is located. In response to the RF signal (e.g., request), the processors of all of the smart objects throughout the facility that receive the request may respond by transmitting a signal, such as an ultrasound signal, on a second communication channel. Due to the nature of radio-frequency signal propagation, the RF signal sent on the first communication channel will likely penetrate walls, floors, ceilings, and other structures within the facility. Thus, the RF signal sent on the first communication channel will likely reach smart objects that are within the defined area or room and also those smart objects that are outside the defined area or room.

In block 408, the processor of the control device may receive the signal on the second communication channel from smart objects that have received the RF signal. The processor of the control device may receive the signal on the second communication from the subset of smart objects within the same room. Due to the ultrasound filtering action of the walls, floors, or other structures separating the control device from the smart objects outside the room, the processor of the control device may not receive the signal on the second communication channel from smart objects that are not within the same room. Thus, the use of ultrasound signals in the second communication channel and the filtering action of the walls, floors and other structures provides the advantage of enabling the processor to efficiently identify those smart objects within a confined area in which the control device is positioned. In some embodiments, the processor of the control device may receive an attenuated ultrasound signal from a smart object that is outside the room. In such embodiments, the processor may ignore that smart object, such as if the volume or level of the ultrasound signal is below a minimum threshold. Thus, the control device may rely on the signals received on the second communication channel to identify the smart objects that are within the same room for naming purposes.

The processor of the control device may receive and process the response transmitted by the smart objects on the second communication channel directly as a networking framework function invoked by the networking framework standard client on the control device and the thin client on each smart object. Alternatively, the receipt by the processor of the control device of the transmission of the response on the second communication channel may be accomplished, at least initially, outside the networking framework as an out-of-framework or out-of-band communication. Such an out-of-framework communication may be internalized into the networking framework upon receipt by the control device, such as by incorporating the data or results of the out-of-framework communication into a framework status, state, function, etc.

In determination block 410, the processor of the control device may determine whether an ultrasound signal has been received from a smart object. The control device may or may not have previously received a list of all smart objects registered with the networking framework. In a case in which the control device has received a list, such as through interaction with the networking framework, the receipt of ultrasound signals may be reconciled against each smart object on the list. If no list is received, the processor of the control device may build a display list of smart objects based on the reception of the ultrasound signals. However, a list of all smart objects may be different (e.g., may include more entries) than a list of smart objects from which ultrasound signals have been received.

In response to determining that an ultrasound signal has been received from the smart object (i.e., determination block 410="Yes"), the processor of the control device may display or highlight the smart object on a user interface display based on the generic name of the smart object in block 412. In embodiments in which the processor of the control device receives a list of smart objects that have registered with the framework, the processor of the control device may highlight the smart objects in the list from which ultrasound signals have been received, such as on a user interface of the control device. In embodiments in which the processor has not already received a list of the smart objects that are registered with the framework, the processor of the control device may display the smart object, such as by generic name in the user interface of the control device.

In response to determining that a signal has not been received from a smart object, such as through a reconciliation process (i.e., determination block 410="No"), the processor of the control device may determine whether all the smart objects from which ultrasound signals have been received are accounted for in determination block 414.

In some embodiments, as ultrasound signals are received, the processor of the control device may send individual messages to the smart objects from which ultrasound signals have been received indicating that those smart objects can cease transmission of the ultrasound signal. Alternatively, when all smart objects from which ultrasound signals have been received are presented or highlighted in the display of the control device, a broadcast message may be transmitted on the RF communication channel to all of the smart objects to cease transmission of the ultrasound signal. In some embodiments, the control device may be equipped with an ultrasound transmitter and the smart objects may be equipped with ultrasound receivers, whereupon the control device may acknowledge receipt of the ultrasound signal from each device by transmitting an ultrasound acknowledgement individually to each smart object or device.

In response to determining that all smart objects from which ultrasound signals have been received are accounted for, such as by matching listed smart objects with received ultrasound signals (i.e., determination block 414="Yes), the processor of the control device may rename and/or may cause each smart object from which an ultrasound signal was received to be renamed within the networking framework in block 416. Because each smart object from which an ultrasound signal was received is within the same room (e.g., Room 1) as the control device, each smart object may be renamed with new identifying information using a reference to room, such as "Room 1," in the name. In some embodiments, such as when the new identifying information is a name, the room reference may be added as a prefix or suffix, or may be otherwise incorporated with the generic name of the smart object. For example, if the smart objects are smart light bulbs, the new names may be "SmartBulb1Room1, SmartBulb2Room1, . . . " and so on. In some embodiments, the processor of the control device may rename the smart objects only for display on the user interface of the control device. The generic name of the smart object may remain the same within the framework such other users may conduct renaming within their respective control devices. In other embodiments, the processor of the control device may cause the smart object to be renamed within the framework by providing the new identifying information in the form of a new tag, a new identifier, new metadata, etc.

In block 418, the processor of the control device may send a rename command to the smart objects from which ultrasound signals were received. The processor of the control device may rename the smart object using the new identifying information devised in block 416 (e.g., SmartBulb1Room1) using reference to the defined area or room in which the smart object is located. When all of the smart objects from which ultrasound signals are received are successfully renamed and notified of their new identifying information through renaming commands from the control device. In block 420, the processor of the control device may communicate with and control each device by reference to the new identifying information, such as a name, a tag, an identifier, metadata, etc. that includes the room reference.

Figure 4B:
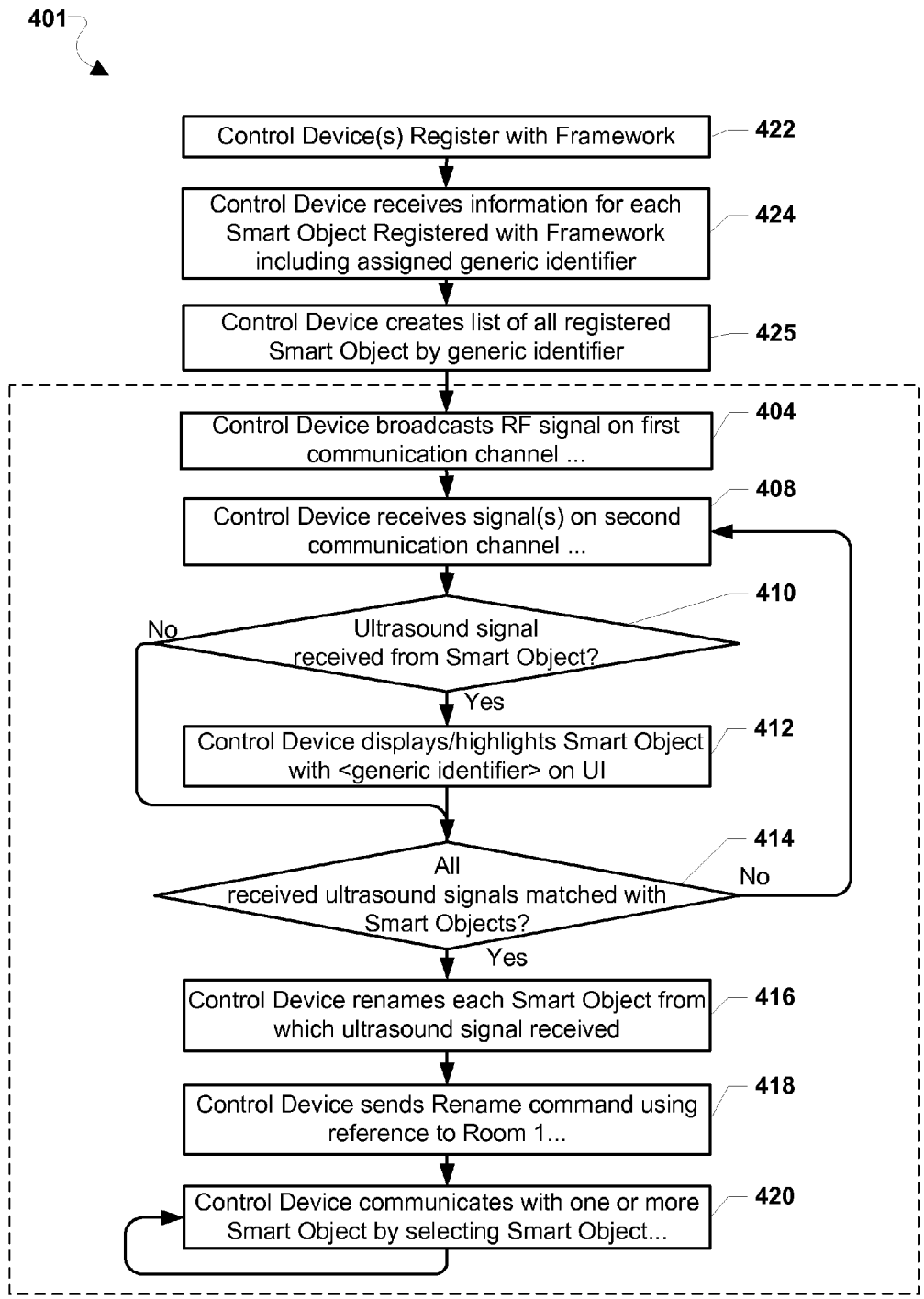
FIG. 4B is a process flow diagram illustrating an embodiment method for registering smart objects.

In an embodiment method 401 illustrated in FIG. 4B, the control device may become aware of smart objects that have registered with the framework. In block 422, the processor of the control device may register with the networking framework. Registration with the framework may involve the processor of the control device advertising its presence and capabilities, connecting with a networking framework server, connecting with other devices already registered with the framework, etc. The processor of the control device may become aware of networking framework services that are available to facilitate connecting with smart objects that may then be controlled by the control device. The processor of each smart object may register with the networking framework and receive a generic identifier assignment (e.g., generic name, identifier, etc.), such as during an onboarding procedure as described hereinafter.

In the AllJoyn® framework, the registration may be accomplished during an "Onboarding" service or procedure executed from the control device. Onboarding may refer to a procedure or series of procedures and/or functions whereby a device advertises itself and/or is discovered by the networking framework. Devices to be onboarded may advertise to all devices capable of receiving the advertising communication. Alternatively or additionally, the device to be onboarded may be discovered, such as by a control device or other devices connected to the networking framework. Alternatively or additionally, the device to be onboarded may be discovered by a networking framework device such as a networking framework server or similar node. In some embodiments, a networking framework node may conduct the advertising to other devices on behalf of the device to be onboarded. Onboarding may further or alternatively involve reporting identification and capability information, and other information (e.g., location information) to other nodes attached to the networking framework such that communication and control actions are possible. The Onboarding service may be available on the control device as part of the networking framework standard client, once the control device is joined or Onboarded with the networking framework.

In block 424, the processor of the control device may receive information for each smart object registered with the framework, including the generic identifier assigned to the smart object during onboarding or registration. In block 425, the processor of the control device may create a list of all of the registered smart objects by generic name. For example, the processor of the control device may cause a display item or object associated with each registered smart object to be displayed on the user interface (UI) of the control device along with the generic name assigned during registration.

The operations in the blocks 404-420 are the same as described above with reference to FIG. 4A, and therefore the description of the blocks 404-420 is omitted for brevity. However, in block 412, the processor of the control device may highlight the smart object from which an ultrasound signal was received on a second communication channel. In the illustrated embodiment, a list of registered smart objects may already be displayed on the UI of the control device, therefore, the processor of the control device may highlight the smart objects from which an ultrasound signal is received. Such highlighting may result in a display of highlighted smart objects, which is a subset of all the registered smart objects in the displayed list. The highlighted smart objects may also represent the smart objects that are in the same defined area as the control device. The highlighted smart objects may also represent the smart objects that require renaming.

Figure 4C:
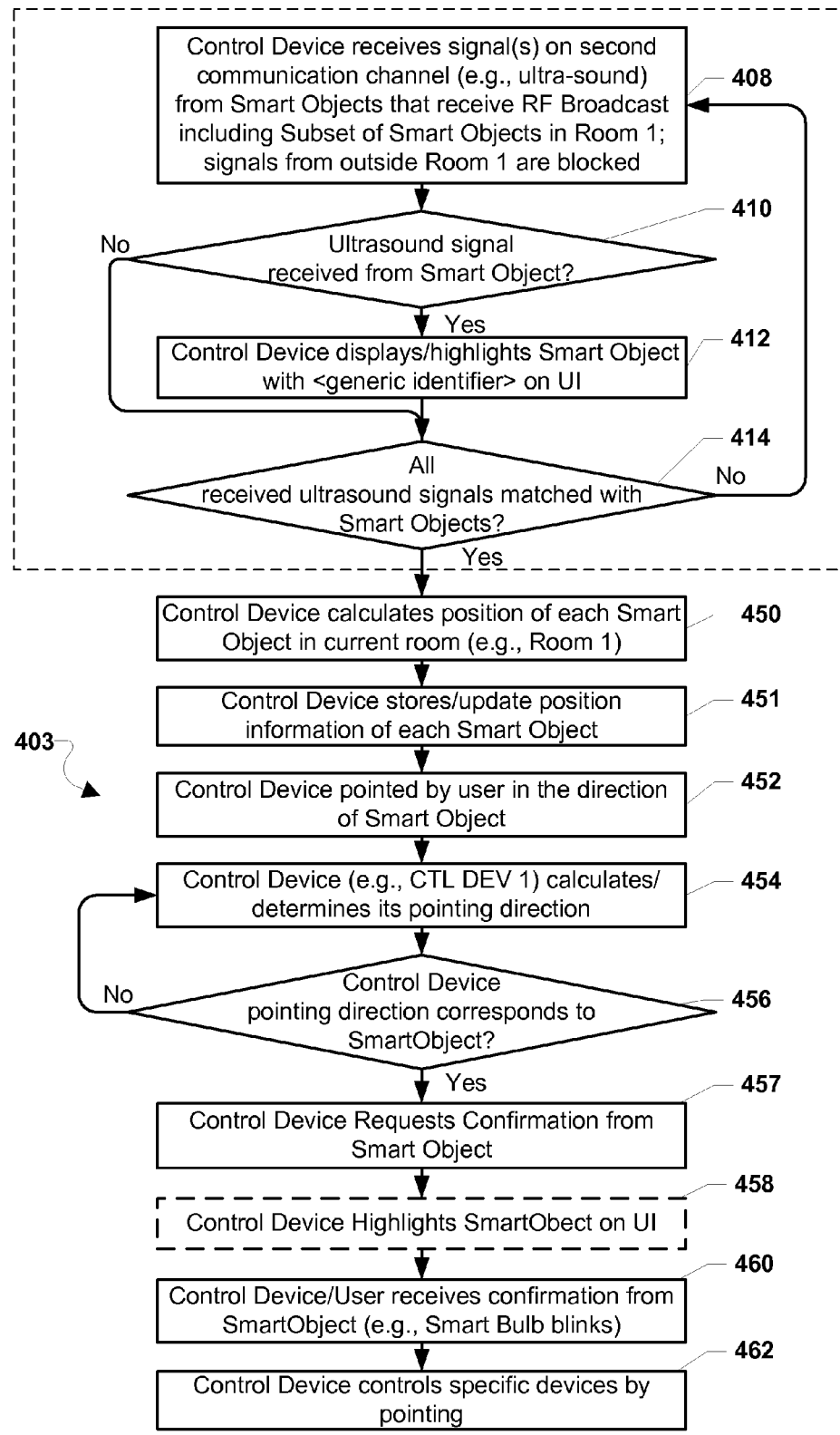
FIG. 4C is a process flow diagram illustrating an embodiment method for pointing and control of smart objects.

In an embodiment method 403 illustrated in FIG. 4C, the position of smart objects (e.g., smart objects) may be determined. In any situation in which one or more of the smart objects are transmitting an ultrasound signal, the control device may determine the position of the smart object. For example, when the processor performs one or more of the operations described above with reference to blocks 408, 410, 412, and 414 of the embodiment methods 400 and 401, ultrasound signals may be transmitted from the smart objects. A full description of the operations in blocks 408, 410, 412, and 414 is provided above with reference to FIG. 4A. In some embodiments, the control device may be equipped with two or more ultrasound receiving elements, such as microphones, microphone elements or other transducer elements and configured to calculate the bearings to or positions of smart objects within a three-dimensional coordinate system. Thus, in block 450, the processor of the control device may calculate the position of each of the smart objects in the current defined area or room (e.g., Room 1). The position may be calculated in two or three dimensions based on the received ultrasound signals or other information. In block 451, the processor of the control device may store the calculated position information of each smart object or may use the calculated position to update position information previously stored for each smart object such as in a memory associated with or accessible to the control device.

In the various embodiments, the control device may be equipped with an element or elements, such as accelerometers, compass elements, or other elements, capable of determining the direction in which the control device is pointing. Pointing may be defined as a direction or orientation relative to a reference point, such as the front of the control device and a coordinate system or positional system. In block 452, the processor of the control device may determine that the control device is being pointed by a user in the direction of a smart object in order to address an object targeted for interaction.

In block 454, the processor of the control device may calculate the pointing direction of the control device. The pointing direction may be calculated in two dimensions (e.g., x, y) or three dimensions (e.g., x, y, z) based on outputs from an accelerometer, a gyroscope, or similar elements, or a combination of these or similar elements. Alternatively or in addition, the pointing direction may be calculated or estimated on an ad-hoc basis, a relative basis, dead reckoning basis, or other basis. In some embodiments, the pointing direction may be calculated, estimated, or refined using information gained from receiving ultrasounds signals by the control device. The pointing direction may be calculated, estimated or obtained through interactions with the smart objects as described herein. In such an embodiment, the smart objects may calculate a relative position to the control device on an ad-hoc basis and communicate the position to the control device. In other embodiments, the smart objects may calculate a relative position to one or more other smart objects and may further communicate the position to the control device. Other sensors, such as a camera, may be used to develop, refine or confirm the pointing direction of the control device. In the various embodiments, the pointing direction of the control device may be continuously or periodically monitored such that a pointing direction may be calculated when an operation of the control device is invoked to interact with a smart object.

In determination block 456, the processor of the control device, may determine whether the calculated pointing direction of control device corresponds to a position of a smart object. In some embodiments, the current pointing direction may correspond to more than one smart object. Thus, the processor of the control device may identify one or more smart objects that correspond to the calculated pointing direction.

In response to determining that the calculated pointing direction corresponds to the bearing to or position of a smart object (i.e., determination block 456="Yes"), the processor of the control device may transmit a message addressed to that smart object requesting to confirm its identity in block 457. The confirmation request may be confirmation that the smart object to which the control device is pointing actually corresponds to the device targeted for interaction by the user of the control device. In some embodiments, the position of a smart object and the correspondence of a given pointing direction and the smart object's position may have already been established. In block 458, the smart object at which the control device is pointing may optionally be highlighted on the user interface of the control device in block 458. Such highlighting may be useful when more than one smart object lies in the same pointing direction relative to the control device.

In response to receiving the confirmation request message sent by the processor of the control device in block 457, the smart object may provide a confirmation indication. The confirmation indication may include blinking for a smart light bulb, emitting a tone for a smart object capable of producing audio, or other confirmation or combination of confirmations. By receiving a visible or audible confirmation, the user is able to visually or audibly confirm that the smart object at which the control device is currently pointing (or at which the control device is intended to be pointing) is the intended smart object.

In block 460, the processor of the control device may receive the confirmation from the smart object at which the control device is pointing. For example, in some embodiments, the processor of the control device may receive data from a video or audio capturing device (e.g., camera and/or microphone) of the control device. The confirmation may include a flashing sequence and/or audio tone that may be captured by the camera and/or microphone of the control device and used by the processor of the control device when processing the captured audio or video data. In other embodiments, the user of the control device may observe the audio or visual confirmation and confirm the pointing direction of the control device by pushing a confirmation button on the user interface. In block 462, the processor of the control device may control the smart object by pointing at the device. For example, the pointing and confirmation may establish the correct smart object with which interaction is intended including the identifying information for the smart object. Thereafter, networking framework operations may be invoked using the correct identifying information for the confirmed device including renaming and other actions available through the networking framework. The pointing based control may proceed over the RF communication channel when smart objects have been identified, renamed and confirmed with the control device and networking framework.

Figure 5:
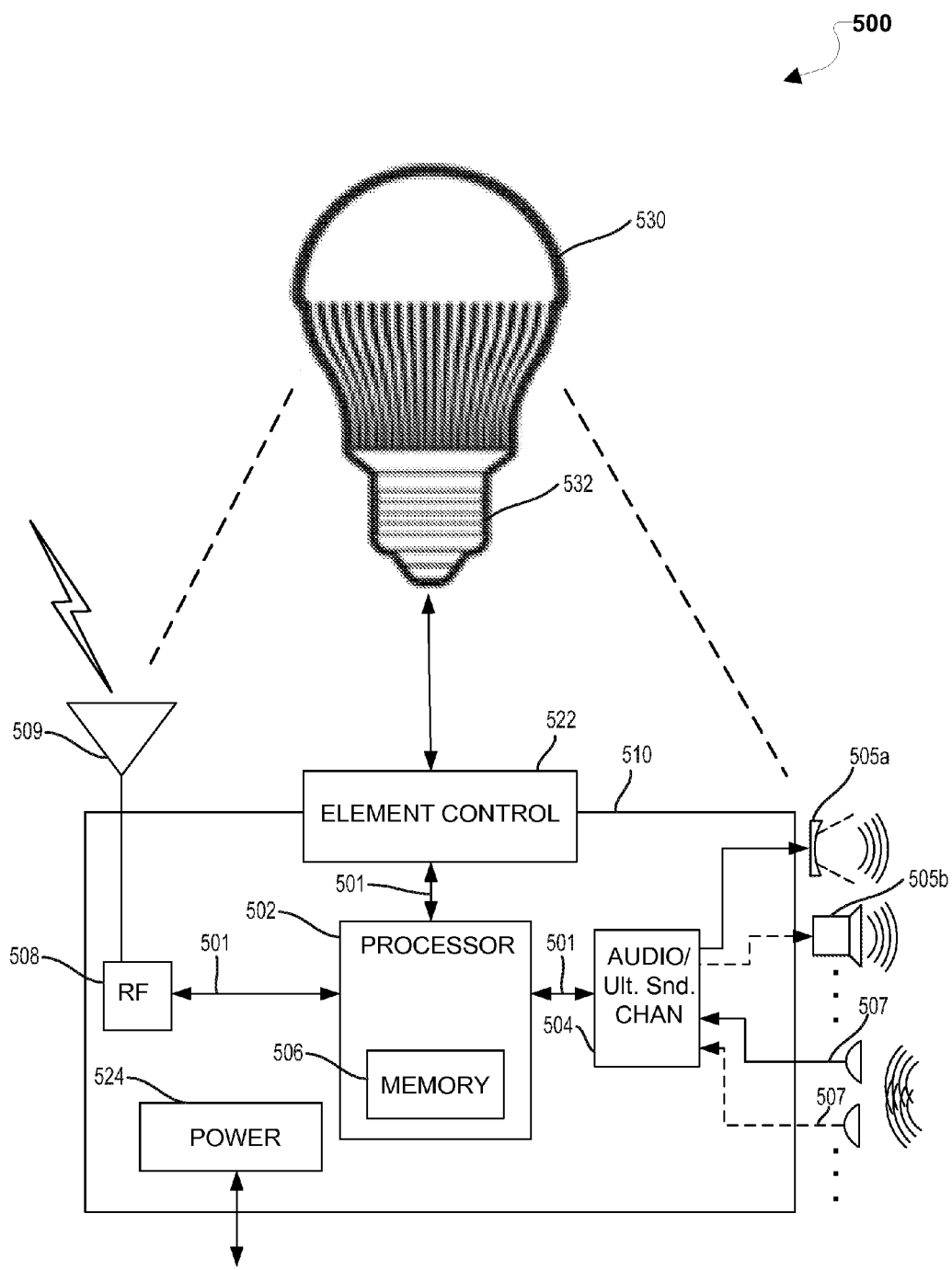
FIG. 5 is a component diagram of an example smart object suitable for use with the various embodiments.

The smart objects or smart objects described herein may be virtually any device having the capability of connecting to a network and providing a secondary communication channel, such as an ultrasound channel. In an embodiment, as illustrated in FIG. 5, the device or smart object may include a smart bulb 500. The smart bulb 500 may include a controllable active element 530 such as a light emitting diode (LED) element. In some embodiments, the smart bulb 500 may include a base 532 for inserting the smart bulb 500 into a socket or receptacle (not shown). The base 532 may be any of a wide variety of bulb base types such as screw type bulb bases that are well known to those of skill in the art. The bulb base 532 may also be a non-standard or proprietary base. The socket or receptacle typically provides a source of power, generally alternating current (AC) power by which the smart bulb 500 may obtain power to operate the active element 530.

The smart bulb 500 may be equipped with a control unit 510, which may include at least a processor 502 and memory 506, an RF unit 508, an audio/ultrasound unit 504, an element control unit 522, and a power unit 524. The various units within the control unit 510 may be coupled through connections 501. The connections 501 may be a bus configuration that may include data lines, control lines, power lines, or other lines or a combination of lines. The processor 502 may be capable of executing at least a thin client version of the networking framework to control the operation of, receive status from, and perform other operations using the connection 501. The processor 502 may be an embedded processor or controller, a general purpose processor, or similar processor and may be equipped with internal and/or external memory 506. The internal/external memory 506 may be volatile or non-volatile memory, and may also be secure and/or encrypted memory, or unsecure and/or unencrypted memory, or any combination thereof. The control unit 510 may have one or more radio signal transceivers 508 (e.g., Peanut, Bluetooth, Bluetooth LE, Zigbee, Wi-Fi, RF radio, etc.) and antennae 509, for sending and receiving communications, coupled to each other and/or to the processor 502. The transceivers 508 and antennae 509 may be used with the above-mentioned circuitry to implement the various wireless transmission protocol stacks and interfaces and may be controllable by at least a thin client version of the networking framework. The audio/ultrasound unit 504 may include an ultrasound emitter 505a for transmitting ultrasound signals as described herein in connection with a second communication channel. Alternatively or additionally, the audio/ultrasound unit 504 may include a speaker or transducer 505b capable of transmitting ultrasound and/or audio signals. In alternative embodiments, the audio/ultrasound unit 504 may further include one or more ultrasound receiver 507 for receiving ultrasound signals. In examples where the smart bulb 500, or any smart object, is provided with ultrasound receivers, assistance may thereby be provided in developing position information for the smart objects. Alternatively or in addition, the audio components, such as the speaker or transducer 505b may be used for bidirectional secondary communication.

Figure 6:
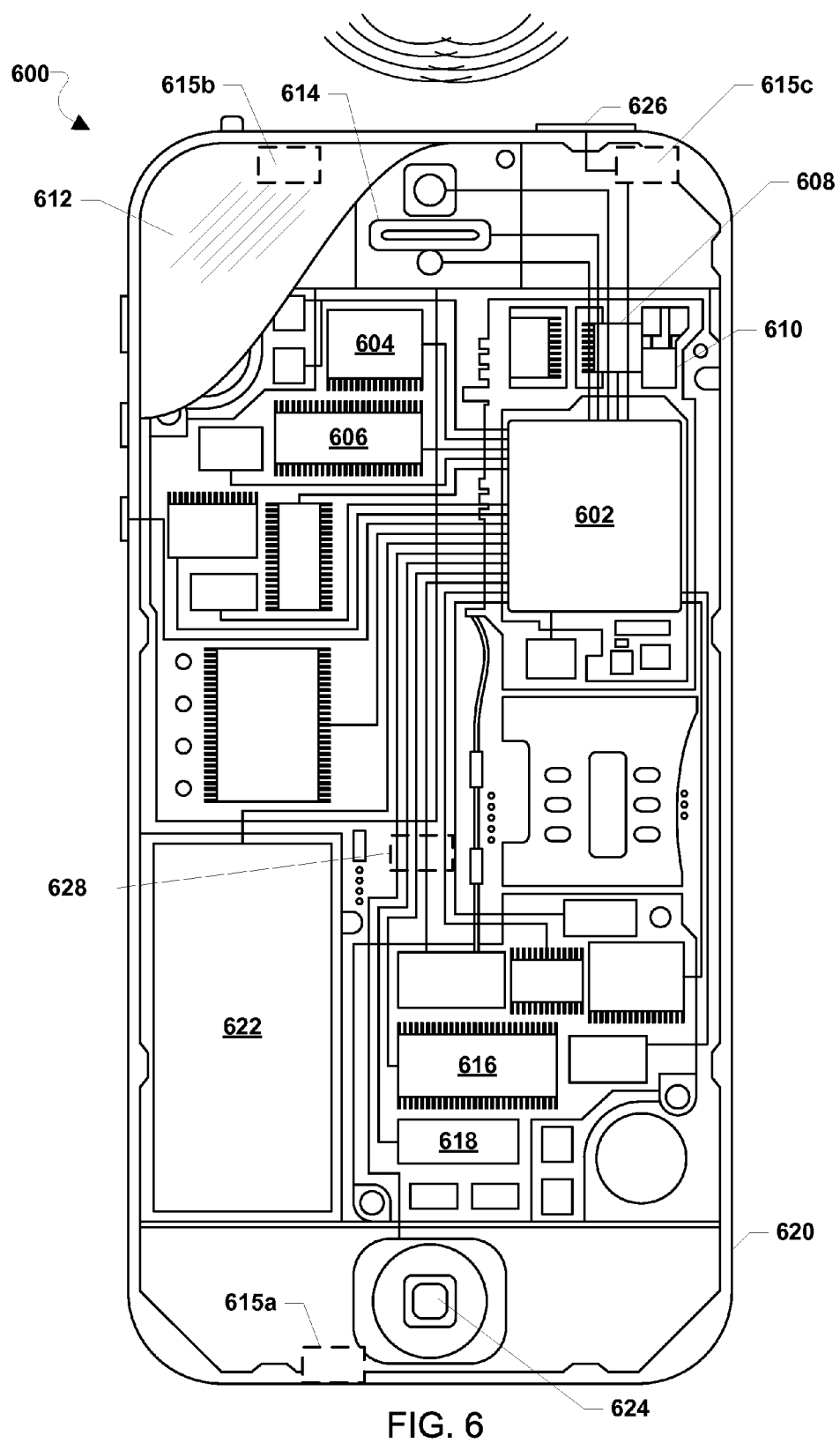
FIG. 6 is a component diagram of an example mobile computing device suitable for use with the various embodiments.

The various aspects may be implemented in any of a variety of mobile computing smart objects (e.g., smartphones, tablets, etc.) an example of which is illustrated in FIG. 6. The mobile computing device 600 may include a processor 602 coupled the various systems of the computing device 600 for communication with and control thereof. For example, the processor 602 may be coupled to a touchscreen controller 604, radio communication elements, speakers and microphones, and an internal memory 606. The processor 602 may be one or more multi-core integrated circuits designated for general or specific processing tasks. The internal memory 606 may be volatile or non-volatile memory, and may also be secure and/or encrypted memory, or unsecure and/or unencrypted memory, or any combination thereof. In another embodiment (not shown), the computing device 600 may also be coupled to an external memory, such as an external hard drive.

The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the mobile computing device 600 need not have touch screen capability. The mobile computing device 600 may have one or more radio signal transceivers 608 (e.g., Peanut, Bluetooth, Bluetooth LE, Zigbee, Wi-Fi, RF radio, etc.) and antennae 610, for sending and receiving communications, coupled to each other and/or to the processor 602. The transceivers 608 and antennae 610 may be used with the above-mentioned circuitry to implement the various wireless transmission protocol stacks and interfaces. The mobile computing device 600 may include a cellular network wireless modem chip 616 that enables communication via a cellular network and is coupled to the processor.

The mobile computing device 600 may include a peripheral device connection interface 618 coupled to the processor 602. The peripheral device connection interface 618 may be singularly configured to accept one type of connection, or may be configured to accept various types of physical and communication connections, common or proprietary, such as USB, FireWire, Thunderbolt, or PCIe. The peripheral device connection interface 618 may also be coupled to a similarly configured peripheral device connection port (not shown).

In some embodiments, the mobile computing device 600 may include microphones 615. In various embodiments, the mobile computing device 600 may be equipped with a single microphone or multiple microphones. For example, the mobile computing device may have a conventional microphone 615a for receiving voice or other audio frequency energy from a user during a call. The mobile computing device 600 may further be configured with additional microphones 615b and 615c that may be configured to receive audio including ultrasound signals. A single microphone may be used for "presence" information, such as detecting devices that are present in the same room. Multiple microphones may be used to develop relative position information. Alternatively, all microphones 615a, 615b, and 615c may be configured to receive ultrasound signals. The microphones 615 may be piezo-electric transducers, or other conventional microphone elements. Because more than one microphone 615 may be used, relative location information may be received in connection with a received ultrasound signal through various methods such as triangulation, trilateration, multilateration, etc. At least two microphones 615 configured to receive ultrasound signals may be used to generate position information for an emitter of ultrasound energy.

The mobile computing device 600 may also include speakers 614 for providing audio outputs. The mobile computing device 600 may also include a housing 620, constructed of a plastic, metal, or a combination of materials, for containing all or some of the components discussed herein. The mobile computing device 600 may include a power source 622 coupled to the processor 602, such as a disposable or rechargeable battery. The rechargeable battery may also be coupled to the peripheral device connection port to receive a charging current from a source external to the mobile computing device 600. The mobile computing device 600 may also include a physical button 624 for receiving user inputs. The mobile computing device 600 may also include a power button 626 for turning the mobile computing device 600 on and off.

In some embodiments, the mobile computing device 600 may further include an accelerometer 628 that senses movement, vibration, and other aspects of the device through the ability to detect multi-directional values of and changes in acceleration. In the various embodiments, the accelerometer 628 may be used to determine the x, y, and z positions of the mobile computing device 600. Using the information from the accelerometer, a pointing direction of the mobile computing device 600 may be detected.

The various embodiments may include an embodiment method for interacting with smart objects in a room by a control device executing a networking framework. An embodiment method may include broadcasting a signal on a first communication channel associated with the networking framework from the control device for reception by a plurality of smart objects registered with the networking framework. The signal may be configured to cause one or more of the plurality of smart objects to transmit, via a second communication channel associated with the networking framework, a response signal including a generic name of the smart object that was assigned during registration with the networking framework. The method may further include receiving, by the control device, response signals transmitted by smart objects within the room, because response signals transmitted by smart objects outside the room will be blocked by walls, floors and ceilings of the room. The control device may rename within the networking framework each smart object from which response signals were received with new identifying information that includes a reference to a room in which the control device is located. In an embodiment the method may further include communicating with one or more of the renamed smart objects via the networking framework using the new identifying information including the reference to the room. A further embodiment method may include assigning the renamed smart object to a group, with the new identifying information including reference to the assigned group. In an embodiment the method may further include receiving, in the control device, from one or more of the renamed smart objects, two or more ultrasound signals, and calculating, in the control device, a relative position of the one or more renamed smart objects based on the received two or more ultrasound signals.

In an embodiment the method may include receiving two or more ultrasound signals transmitted from the control device in one or more of the renamed smart objects. The renamed smart objects may calculate a relative position of the control device based on the received two or more ultrasound signals, and transmit the calculated relative position to the control device on the first communication channel. In an embodiment, the first communication channel of the networking framework may include a radio communication channel and the second communication channel of the networking framework may include ultrasound signals.

In an embodiment the method may include determining, in the control device, one or more of: presence of; relative bearings to; and or positions of each of the plurality of smart objects from which ultrasound signals were received. Further in an embodiment, renaming within the networking framework of each of the smart objects from which ultrasound signals were received may be based on determined relative bearings to or positions of each smart object. In an embodiment the method may further include determining a pointing direction of the control device. In an embodiment the method may further include correlating the determined pointing direction with one of the determined relative bearings to or positions of each of the smart objects in the subset of smart objects, and providing an indication using the new identifying information of the smart object having a relative bearing or position that correlates to the pointing direction of the control device. In an embodiment, each of the smart objects may be configured with a thin client associated with the communications framework. In an embodiment, the networking framework may be an AllJoyn® framework, and renaming, by the control device, within the networking framework each smart object from which response signals were received with a new identifying information that includes a reference to a room in which the control device is located may include replacing a generic name of the smart objects that was assigned during an AllJoyn® Onboarding procedure.

Further embodiments may include a method for communicating with a plurality of smart objects that includes registering each of the plurality of smart objects with a networking framework including assigning a generic unique name to each of the plurality of smart objects for use in addressing communications via the networking framework. In an embodiment the method may further include registering a control device with the networking framework during which the control device receives a list of the plurality of smart objects including their assigned generic names. In an embodiment the method may further include broadcasting a signal on a radio communication channel of the networking framework from the control device for reception by the plurality of smart objects, in which the signal is configured to prompt smart objects receiving the signal to respond with an ultrasound signal. In an embodiment the method may further include broadcasting from each of the plurality of smart objects an ultrasonic signal that includes the assigned generic name in response to receiving the signal on the radio communication channel. In an embodiment the method may further include receiving, in the control device, ultrasound signals from smart objects, and renaming within the networking framework each smart object from which ultrasound signals were received with a new identifying information that includes a reference to a room in which the control device is located. In an embodiment the method may further include communicating with one or more of the smart objects in the room via the networking framework using the new identifying information.

In an embodiment the method may further include determining, by the control device, relative positions of each of the smart objects in the room based on received ultrasound signals. In an embodiment the networking framework each of the smart objects from which ultrasound signals were received is based on the determined relative position of each of the smart objects. In an embodiment the method may further include determining a pointing direction of the control device. In an embodiment the may further include correlating the determined pointing direction with one of the determined relative positions of each of the smart objects. In an embodiment the method may further include providing an indication using the new identifying information of the smart object having a relative position that correlates to the pointing direction of the control device. In an embodiment each of the smart objects may include a thin client associated with the communications framework, which may be an AllJoyn® framework, in which case assigning a generic unique name to each of the plurality of smart objects for use in addressing communications via the networking framework may include assigning a local name during an AllJoyn® onboarding procedure.

The various embodiments include a control device having a processor and circuitry configured to perform one or more operations associated with the above described embodiment methods. The various embodiments include a control device having means for performing functions of the above described embodiment methods. The various embodiments further include a non-transitory processor-readable storage medium having stored thereon processor-executable instructions configured to cause a processor of a control device to perform operations of the above described embodiment methods. The various embodiments further include a system including a control device and one or more smart objects coupled to the control device, in which the control device and the one or more smart objects include a processor and circuitry configured to perform one or more operations of the above described embodiment methods. The various embodiments further include a system including means for performing functions of the above described embodiment methods.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Further, the implementation of the various embodiment methods and operations in a processor, computer, controller, or other device, such as based on the algorithms and processes described herein, may improve the operation of the underlying processor or computer.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for interacting with smart objects in a defined area by a control device executing a networking framework, the method comprising:

broadcasting, from the control device, a signal on a radio communication channel associated with the networking framework, wherein the signal is configured for reception by a plurality of the smart objects registered with the networking framework and to cause one or more of the plurality of the smart objects to transmit, via an audio communication channel associated with the networking framework, a response signal including a generic identifier of the one or more of the plurality of the smart objects that was assigned during registration with the networking framework;

receiving, by the control device, the response signals transmitted by a subset of the plurality of the smart objects that are within the defined area;

renaming based on the response signals received via the audio communication channel, by the control device, within the networking framework each smart object from which the response signals were received with new identifying information that includes a reference to the defined area in which the control device and the subset of the plurality of the smart objects are located; and communicating, by the control device, with one or more of the renamed smart objects via the networking framework using the new identifying information including the reference to the defined area.

2. The method of claim 1, further comprising assigning one or more of the renamed smart objects to a group, the new identifying information further including a reference to the assigned group.

3. The method of claim 1, further comprising:
receiving, in the control device, from one or more of the renamed smart objects, ultrasound signals in two or more ultrasound receivers of the control device; and
calculating, in the control device, a relative position of the one or more renamed smart objects based on the ultrasound signals received in the two or more ultrasound receivers of the control device.

4. The method of claim 1, further comprising:
transmitting ultrasound signals from the control device to one or more of the renamed smart objects, wherein the transmitted ultrasound signals are capable of being received in two or more ultrasound receivers associated with each of the one or more of the renamed smart objects so as to enable each of the one or more of the renamed smart objects to calculate a relative position of the control device based on the received ultrasound signals; and
receiving, by the control device, the calculated relative position transmitted from the one or more of the renamed smart objects to the control device on the radio communication channel.

5. The method of claim 1, wherein the audio communication channel of the networking framework comprises an ultrasound communication channel.

6. The method of claim 5, further comprising determining, in the control device, one or more of: a presence of; a relative bearing to; and a position of each of the plurality of smart objects from which ultrasound signals were received, wherein renaming within the networking framework of each of the smart objects from which ultrasound signals were received is based on the determined one or more of: the presence; the relative bearing to; and the position of each of the plurality of smart objects from which ultrasound signals were received.

7. The method of claim 6, further comprising:
determining, by the control device, a pointing direction of the control device;
comparing, by the control device, the determined pointing direction with one of the determined relative bearing to or the position of each of the smart objects in the subset of the plurality of smart objects within the defined area; and
providing an indication, by the control device on a display, of one of the plurality of smart objects having a relative bearing to or position that corresponds to the pointing direction of the control device based on comparing the determined pointing direction with the one of the determined relative bearing to or position of the one of the plurality of smart objects.

8. The method of claim 1 further comprising:
registering each of the plurality of smart objects with the networking framework including assigning a generic unique identifier to each of the plurality of smart objects for addressing communications to each of the plurality of smart objects via the networking framework;
registering the control device with the networking framework during which the control device receives a list of the plurality of smart objects including their assigned generic identifiers.

9. The method of claim 1, wherein the audio communication channel has a frequency below 20 Khz.

10. A control device, comprising:
a transceiver; and
a processor coupled to the transceiver, wherein the processor is configured with processor-executable instructions to perform operations comprising:
broadcasting a signal on a radio communication channel associated with a networking framework, wherein the signal is configured for reception by a plurality of smart objects registered with the networking framework and to cause one or more of the plurality of smart objects to transmit, via an audio communication channel associated with the networking framework, a response signal including a generic identifier of the one or more of the plurality of the smart objects that was assigned during registration with the networking framework;
receiving the response signals transmitted by a subset of the plurality of smart objects that are within the defined area;
renaming within the networking framework, based on the response signals received via the audio communication channel, each smart object from which the response signals were received with new identifying information that includes a reference to the defined area in which the control device and the subset of the plurality of smart objects are located; and
communicating with one or more of the renamed smart objects via the networking framework using the new identifying information including the reference to the defined area.

11. The control device of claim 10, wherein the processor is configured with processor-executable instructions to perform operations further comprising assigning the renamed smart object to a group, the new identifying information further including a reference to the assigned group.

12. The control device of claim 10, wherein the processor is configured with processor-executable instructions to perform operations further comprising:
receiving from one or more of the renamed smart objects, ultrasound signals in two or more ultrasound receivers of the control device; and
calculating a relative position of the one or more renamed smart objects based on the ultrasound signals received in the two or more ultrasound receivers of the control device.

13. The control device of claim 10, wherein the processor is configured with processor-executable instructions to perform operations further comprising:
transmitting ultrasound signals to one or more of the renamed smart objects; and
receiving a calculated relative position transmitted from the one or more of the renamed smart objects to the control device on the radio communication channel.

14. The control device of claim 10, wherein audio communication channel of the networking framework comprises an ultrasound communication channel.

15. The control device of claim 14, wherein the processor is configured with processor-executable instructions to perform operations further comprising determining one or more of a presence of, a relative bearing to, and a position of each of the plurality of smart objects from which ultrasound signals were received,
- wherein renaming within the networking framework of each of the smart objects from which ultrasound signals were received is based on the determined one or more of the presence, the relative bearing to, and the position of each of the plurality of smart objects from which ultrasound signals were received.

16. The control device of claim 15, wherein the processor is configured with processor-executable instructions to perform operations further comprising:
- determining a pointing direction of the control device;
- comparing the determined pointing direction with one of the determined relative bearings to or the position of each of the smart objects in the subset of the plurality of smart objects within the defined area; and
- providing, on a display of the control device, an indication of one of the plurality of smart objects having a relative bearing or position that corresponds to the pointing direction of the control device based on the comparing the determined pointing direction with the one of the determined relative bearings to or position of the one of the plurality of smart objects.

17. A control device executing a client for a networking framework, comprising:
- means for broadcasting a signal on a radio communication channel associated with the networking framework, wherein the signal is configured for reception by a plurality of smart objects registered with the networking framework and to cause one or more of the plurality of smart objects to transmit, via an audio communication channel associated with the networking framework, a response signal including a generic identifier of the one or more of the plurality of smart objects that was assigned during registration with the networking framework;
- means for receiving the response signals transmitted by a subset of the plurality of smart objects that are within the defined area;
- means for renaming within the networking framework, based on the response signals received via the audio communication channel, each smart object from which the response signals were received with new identifying information that includes a reference to the defined area in which the control device and the subset of the plurality of smart objects are located; and
- means for communicating with one or more of the renamed smart objects via the networking framework using the new identifying information including the reference to the defined area.

18. The control device of claim 17, further comprising means for assigning the renamed smart object to a group, the new identifying information further including a reference to the assigned group.

19. The control device of claim 17, further comprising:
- means for receiving, from one or more of the renamed smart objects, ultrasound signals in two or more ultrasound receivers of the control device; and
- means for calculating a relative position of the one or more renamed smart objects based on the ultrasound signals received in the two or more ultrasound receivers of the control device.

20. The control device of claim 17, further comprising:
- means for transmitting ultrasound signals to one or more of the renamed smart objects; and
- means for receiving a calculated relative position transmitted from the one or more of the renamed smart objects to the control device on the radio communication channel.

21. The control device of claim 17, wherein the audio communication channel of the networking framework comprises an ultrasound communication channel.

22. The control device of claim 21, further comprising means for determining one or more of a presence of, a relative bearing to, and a position of each of the plurality of smart objects from which ultrasound signals were received,
- wherein means for renaming within the networking framework of each of the smart objects from which ultrasound signals were received is based on a determination of means for determining one or more of the presence, the relative bearing to, and the position of each of the plurality of smart objects from which ultrasound signals were received.

23. The control device of claim 22, further comprising:
- means for determining a pointing direction of the control device;
- means for comparing the determined pointing direction with one of the determined relative bearing to or the position of each of the smart objects in the subset of the plurality of smart objects within the defined area; and
- means for providing an indication on a display of one of the plurality of smart objects having a relative bearing to or position that corresponds to the pointing direction of the control device based on the comparing the determined pointing direction with the one of the determined relative bearing to or position of the one of the plurality of smart objects.

24. A non-transitory processor-readable storage medium having stored thereon processor-executable instructions configured to cause a processor of a control device to perform operations comprising:
- broadcasting a signal on a radio communication channel associated with a networking framework, wherein the signal is configured for reception by a plurality of smart objects registered with the networking framework and to cause one or more of the plurality of smart objects to transmit, via an audio communication channel associated with the networking framework, a response signal including a generic identifier of the one or more of the plurality of smart objects that was assigned during registration with the networking framework;
- receiving the response signals transmitted by a subset of the plurality of smart objects within the defined area;
- renaming within the networking framework, based on the response signals received via the audio communication channel, each smart object from which the response signals were received with new identifying information that includes a reference to the defined area in which the control device and the subset of the plurality of smart objects are located; and
- communicating with one or more of the renamed smart objects via the networking framework using the new identifying information including the reference to the defined area.

25. The non-transitory computer readable medium of claim 24, wherein the stored processor-executable instructions are configured to cause the processor of the control device to perform operations further comprising assigning the renamed smart object to a group, the new identifying information further including a reference to the assigned group.

26. The non-transitory computer readable medium of claim 24, wherein the stored processor-executable instructions are configured to cause the processor of the control device to perform operations further comprising:
receiving from one or more of the renamed smart objects, ultrasound signals in two or more ultrasound receivers of the control device; and
calculating a relative position of the one or more renamed smart objects based on the ultrasound signals received in the two or more ultrasound receivers of the control device.

27. The non-transitory computer readable medium of claim 24, wherein the stored processor-executable instructions are configured to cause the processor of the control device to perform operations further comprising:
transmitting ultrasound signals to one or more of the renamed smart objects; and
receiving a calculated relative position transmitted from the one or more of the renamed smart objects to the control device on the radio communication channel.

28. The non-transitory computer readable medium of claim 24, wherein the stored processor-executable instructions are configured to cause the processor of the control device to perform operations such that:
the signal configured to cause one or more of the plurality of smart objects to transmit, via the audio communication channel associated with the networking framework, a response signal, is further configured to cause one or more of the plurality of smart objects to transmit, via an ultrasound communication channel, the response signal.

29. The non-transitory computer readable medium of claim 28, wherein the processor-executable instructions are configured to cause the processor of the control device to perform operations further comprising determining one or more of a presence of, a relative bearing to, and a position of each of the plurality of smart objects from which ultrasound signals were received,
wherein renaming within the networking framework of each of the smart objects from which ultrasound signals were received is based on the determined one or more of the presence, the relative bearing to, and the position of each of the plurality of smart objects from which ultrasound signals were received.

30. The non-transitory computer readable medium of claim 29, wherein the processor-executable instructions are configured to cause the processor of the control device to perform operations further comprising:
determining a pointing direction of the control device;
comparing the determined pointing direction with one of the determined relative bearings to or the position of each of the smart objects in the subset of the plurality of smart objects within the defined area; and
providing, on a display of the control device, an indication of one of the plurality of smart objects having a relative bearing or position that corresponds to the pointing direction of the control device based on the comparing the determined pointing direction with the one of the determined relative bearings to or position of the one of the plurality of smart objects.

* * * * *